United States Patent
Zhang et al.

(10) Patent No.: US 12,524,198 B1
(45) Date of Patent: Jan. 13, 2026

(54) GAZE BASED DEVICE CONTROL

(71) Applicant: Amazon Technologies, Inc., Seattle, WA (US)

(72) Inventors: Tao Zhang, Melrose, MA (US); Nima Mesgarani, New York, NY (US); Sai Kiran Venkata Subramanya Rupanagudi, Burien, WA (US); Gregory Ciccarelli, Woburn, MA (US); Prachi Patel, New Brunswick, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 18/067,377

(22) Filed: Dec. 16, 2022

(51) Int. Cl.
*G06F 3/16* (2006.01)
*G06F 3/01* (2006.01)
*H04S 7/00* (2006.01)

(52) U.S. Cl.
CPC .............. *G06F 3/167* (2013.01); *G06F 3/013* (2013.01); *H04S 7/304* (2013.01)

(58) Field of Classification Search
CPC ...................................... G06F 3/167
USPC ......................................... 704/275
See application file for complete search history.

(56) References Cited

U.S. PATENT DOCUMENTS

| | | | | |
|---|---|---|---|---|
| 6,542,081 | B2 * | 4/2003 | Torch ................... | G08B 25/016 340/576 |
| 10,133,544 | B2 | 11/2018 | Helwani et al. | |
| 10,617,842 | B2 | 4/2020 | Maques et al. | |
| 2003/0042303 | A1 * | 3/2003 | Tsikos ................ | G06K 7/10594 235/384 |
| 2011/0010627 | A1 | 1/2011 | Donaldson et al. | |
| 2011/0153044 | A1 | 6/2011 | Lindahl et al. | |
| 2015/0245156 | A1 | 8/2015 | Tsang | |
| 2017/0083494 | A1 * | 3/2017 | Kim ......................... | G06F 3/167 |
| 2018/0014130 | A1 | 1/2018 | Lunner et al. | |
| 2018/0321903 | A1 * | 11/2018 | Vennström .............. | G06F 3/012 |
| 2019/0196586 | A1 | 6/2019 | Laszlo et al. | |
| 2019/0294243 | A1 | 9/2019 | Laszlo et al. | |
| 2019/0324535 | A1 * | 10/2019 | Tungare ................. | G02B 27/01 |
| 2020/0097076 | A1 | 3/2020 | Alcaide et al. | |

(Continued)

FOREIGN PATENT DOCUMENTS

| | | | |
|---|---|---|---|
| EP | 3889834 A2 | 10/2021 | |
| EP | 3889835 A2 | 10/2021 | |

(Continued)

OTHER PUBLICATIONS

Gaze and Eye Tracking: Techniques and Applications in Adas Khan, Muhammad Qasim • Lee, Sukhan (Year: 2019).*

(Continued)

*Primary Examiner* — Bharatkumar S Shah
(74) *Attorney, Agent, or Firm* — Athorus, PLLC

(57) ABSTRACT

Described apparatus, systems, and methods for audibly presenting multiple options to a user and using user signals received from a user device worn by or otherwise coupled to the user, that are generated without any need for physical motion-based interaction from the user, to determine a presented option that is to be selected and performed on behalf of the user. In addition, the disclosed implementations may also be utilized to authenticate a user based on authentication signals received from the user device that are generated without any need for physical motion-based interaction from the user.

20 Claims, 18 Drawing Sheets

(56) References Cited

U.S. PATENT DOCUMENTS

| | | |
|---|---|---|
| 2020/0151308 A1 | 5/2020 | Phillips |
| 2020/0192478 A1 | 6/2020 | Alcaide et al. |
| 2020/0337653 A1 | 10/2020 | Alcaide et al. |
| 2021/0063971 A1 | 3/2021 | Sato et al. |
| 2021/0081163 A1 | 3/2021 | Buckley et al. |
| 2022/0276707 A1 | 9/2022 | Barascud et al. |

FOREIGN PATENT DOCUMENTS

| | | | | |
|---|---|---|---|---|
| IN | 201737035557 A | * | 10/2017 | ............... G06F 3/01 |
| RU | 2797191 C2 | * | 5/2023 | |
| WO | WO-2016142933 A1 | * | 9/2016 | ........... G06F 3/0482 |
| WO | WO-2018118958 A1 | * | 6/2018 | ........... B60K 28/066 |
| WO | WO-2019164737 A1 | * | 8/2019 | ............... A63J 5/00 |

OTHER PUBLICATIONS

Gaze and Eye Tracking: Techniques and Applications in Adas Khan, Muhammad Qasim « Lee, Sukhan (Year: 2019) (Year: 2019).*

Malewar, Amit, "New Biosensor Armband Detects Which Hand Gesture You Want to Make," InceptiveMind Innovation àla Carte, www.inceptivemind.com, Dec. 22, 2020, URL: https://www.inceptivemind.com/new-biosensor-armband-detects-hand-gesture/16845/, 3 pages.

Abiri, R. et al. "A Comprehensive Review of EEG-Based Brain-Computer Interface Paradigms," Journal of Neural Engineering, vol. 16, No. 1, p. 011001, 2019, 21 pages, URL: https://www.etsu.edu/cas/psychology/bcilab/documents/abiri_etal_2019.pdf.

An, W. W. et al. "Decoding Auditory Attention from EEG Using a Convolutional Neural Network," In 2021 43rd Annual International Conference of the IEEE Engineering in Medicine & Biology Society (EMBC), 2021, pp. 6586-6589, URL: https://www.cmu.edu/dietrich/psychology/shinn/publications/pdfs/2021/2021embc_an.pdf.

An, W. W. et al. "Decoding Auditory Attention from Single-Trial EEG for a High-Efficiency Brain-Computer Interface," In 2020 42nd Annual International Conference of the IEEE Engineering in Medicine & Biology Society (EMBC), 2020, pp. 3456-3459, URL: https://www.cmu.edu/dietrich/psychology/shinn/publications/pdfs/2020/2020ieee-embs_an.pdf.

Birbaumer, Niels, "Breaking the Silence: Brain-computer Interfaces (BCI) for Communication and Motor Control," Psychophysiology, vol. 43, No. 6, pp. 517-532, 2006.

Chen, J. et al. "A Spatially-Coded Visual Brain-Computer Interface for Flexible Visual Spatial Information Decoding," IEEE Transactions on Neural Systems and Rehabilitation Engineering, vol. 29, pp. 926-933, 2021, URL: https://ieeexplore.ieee.org/ielx7/7333/9363468/09430520.pdf.

Chen, X. et al. "A High-ITR SSVEP-Based BCI speller," Brain-Computer Interfaces, vol. 1, No. 3-4, pp. 181-191, 2014, URL: https://www.researchgate.net/publication/269998531_A_high-ITR_SSVEP-based_BCI_speller.

Crosse, M. J. et al. "The Multivariate Temporal Response Function (mTRF) Toolbox: A Matlab Toolbox for Relating Neural Signals to Continuous Stimuli," Frontiers in Human Neuroscience, vol. 10, p. 604, 2016, URL: https://www.frontiersin.org/articles/10.3389/fnhum.2016.00604/full, 14 pages.

De Cheveigné, A. et al. "Auditory Stimulus-Response Modeling with a Match-Mismatch Task," Journal of Neural Engineering, vol. 18, No. 4, p. 046040, 2021, URL: https://iopscience.iop.org/article/10.1088/1741-2552/abf771/pdf.

Freeman, W. J. et al. "Spatial Spectra of Scalp EEG and EMG from Awake Humans," Clinical Neurophysiology, vol. 114, No. 6, pp. 1053-1068, 2003, URL: https://escholarship.org/uc/item/67x7q43f.

Gao, H. et al. "An Auditory Brain-Computer Interface Using Virtual Sound Field," In 2011 33rd Annual International Conference of the IEEE Engineering in Medicine and Biology Society (EMBS), Boston Massachusetts, USA, Aug. 30-Sep. 3, 2011, pp. 4568-4571, URL: https://www.researchgate.net/publication/221757227_An_auditory_brain-computer_interface_using_virtual_sound_field.

Higashi, H. et al. "EEG Auditory Steady State Responses Classification for the Novel BCI," In 2011 33rd Annual International Conference of the IEEE Engineering in Medicine and Biology Society (EMBS), Boston Massachusetts, USA, Aug. 30-Sep. 3, 2011, pp. 4576-4579, URL: https://www.researchgate.net/publication/221757229_EEG_auditory_steady_state_responses_classification_for_the_novel_BCI.

Huang, M. et al. "Usage of Drip Drops as Stimuli in an Auditory P300 BCI Paradigm," Cogn Neurodyn, vol. 12, No. 1, pp. 85-94, 2018, URL: https://www.ncbi.nlm.nih.gov/pmc/articles/PMC5801279/pdf/11571_2017_Article_9456.pdf.

Lin, Z. et al. "A Novel P300 BCI Speller Based on the Triple RSVP Paradigm," Scientific Reports, vol. 8, No. 1, pp. 1-9. 2018, URL: https://www.nature.com/articles/s41598-018-21717-y.pdf.

Mesgarani, N. et al. "Augmented Intelligibility in Simultaneous Multi-Talker Environments," In Proceedings of the 2003 International Conference on Auditory Display, Boston, MA, USA, Jul. 6-9, 2003, pp. 71-74, URL: https://www.researchgate.net/publication/228557886_Augmented_intelligibility_in_simultaneous_multi-talker_environments.

Mesgarani, Nima and Edward F. Chang, "Selective Cortical Representation of Attended Speaker in Multi-Talker Speech Perception," Nature, vol. 485, No. 7397, pp. 233-236, 2012; URL: https://www.ncbi.nlm.nih.gov/pmc/articles/PMC3870007/pdf/nihms445767.pdf.

Patel, P. et al. "Interaction of Bottom-Up and Top-Down Neural Mechanisms in Spatial Multi-Talker Speech Perception," Current Biology, vol. 32, Issue 18, Sep. 26, 2022, pp. 3971-3986.e4.

Patel, P. et al. "Joint Representation of Spatial and Phonetic Features in the Human Core Auditory Cortex," Cell Reports, vol. 24, No. 8, pp. 2051-2062, 2018, URL: https://www.cell.com/cell-reports/pdfExtended/S2211-1247(18)31194-X.

Rakotomamonjy, Alain and Vincent Guigue, "BCI Competition III: Dataset II—Ensemble of SVMs for BCI P300 Speller," In IEEE Transactions on Biomedical Engineering, vol. 55, No. 3, pp. 1147-1154, 2008, URL: https://d1wqtxts1xzle7.cloudfront.net/46316533/04454051-libre.pdf?1465326557=&response-content-disposition=inline%3B+filename%3DBCI_Competition_III_Dataset_II_Ensemble.pdf&Expires=1673653284&Signature=AR7-KmNdZq2k69JWjKMo9gBpX4qHQZA3aBUQbxl~NkYrX4eBIGInM2XpU6yY3LDCdoU27OLQ2AIVds9VsCMdQeEhztes.

Santamaría-Vázquez, E. et al. "EEG-Inception: A Novel Deep Convolutional Neural Network for Assistive ERP-Based Brain-Computer Interfaces," IEEE Transactions on Neural Systems and Rehabilitation Engineering, vol. 28, No. 12, pp. 2773-2782, 2020, URL: https://www.researchgate.net/publication/348089241_EEG-Inception_A_Novel_Deep_Convolutional_Neural_Network_for_Assistive_ERP-based_Brain-Computer_Interfaces.

Schreuder, M. et al., "Listen, You are Writing! Speeding up Online Spelling with a Dynamic Auditory BCI," Front Neurosci, vol. 5, article 112, 12 pages, 2011.

* cited by examiner

GAZE BASED DEVICE CONTROL

BACKGROUND

With the continued increase in the use of computer technology, portability of computer technology, and the increase in the amount of private information and secure transactions that occur using computer technology, individual user convenience, privacy, and security continue to become more important.

Today, there are a myriad of mechanisms to authenticate users and provide users with options to select when using computer technology. However, user authentication continues to be a problem with low cost solutions (e.g., password) being inconvenient to users and easy to compromise by malicious attackers. High cost solutions are more cost prohibitive and not universally accepted. Likewise, existing option selection (e.g., answering an incoming call, sending the call to voicemail, sending a message to the caller, etc.) solutions typically require some form of active/physical input from the user, such as physical or verbal selection of a desired option, which some users may wish to avoid while in a public setting or may otherwise be considered disruptive to others.

DETAILED DESCRIPTION

Figure 1:
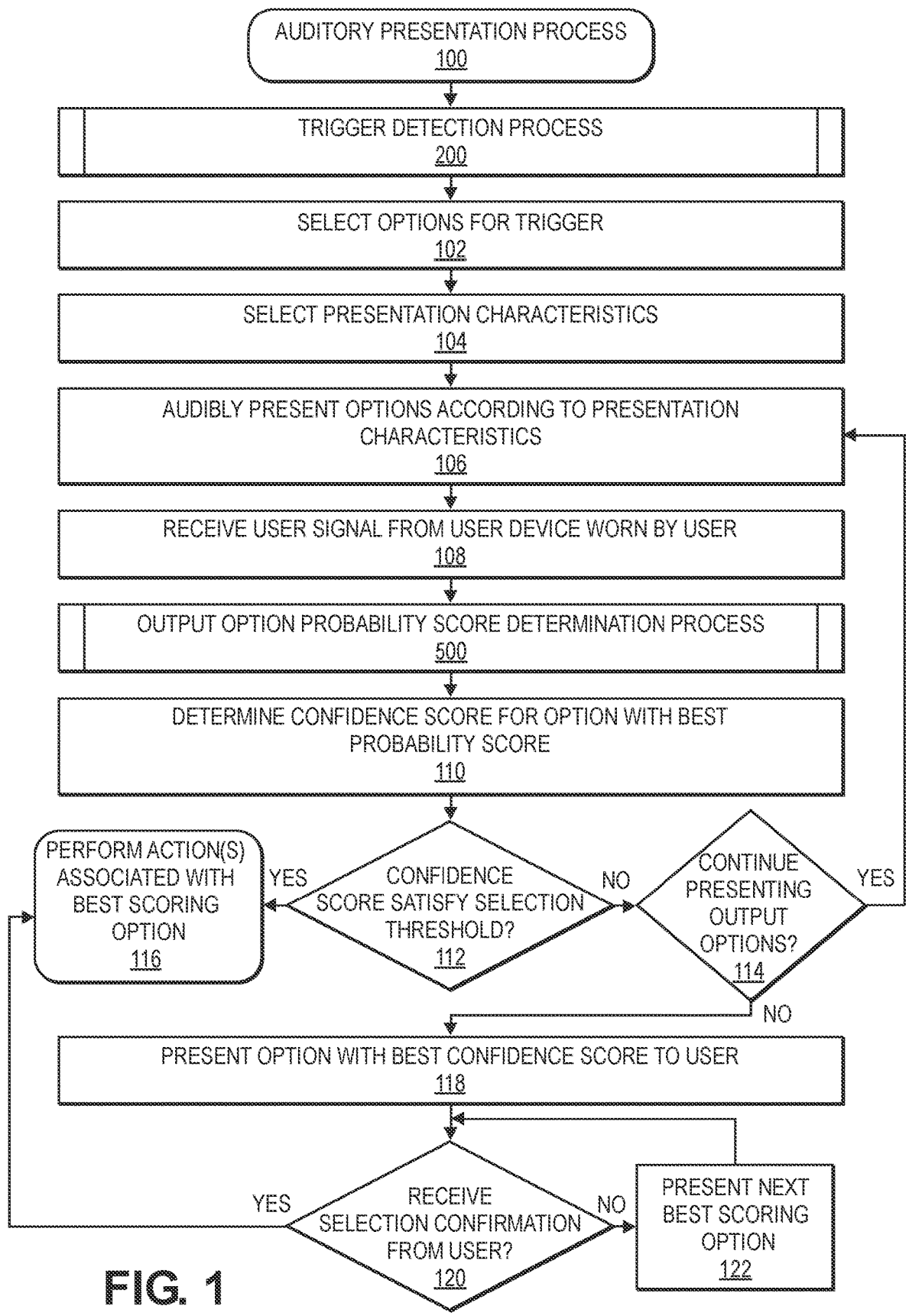
FIG. 1 is an example auditory presentation process, in accordance with implementations of the present disclosure.

As is set forth in greater detail below, implementations of the present disclosure are directed to apparatus, systems, and methods for audibly presenting multiple options to a user and using user signals that are representative of electrical activity detected by sensors of a user device worn by or otherwise coupled to the user when the multiple options are audibly presented to determine a presented option that is to be selected and performed on behalf of the user. In addition, the disclosed implementations may also be utilized to authenticate a user based on authentication signals received from the user device that are generated without any need for physical motion-based interaction from the user.

In some implementations, the user signal received from the user device may be a signal representative of electrical activity detected from the brain of the user in response to the user thinking of a response to an auditory presentation of two or more options, also known as electroencephalography ("EEG") signals, which are a recording of brain activity. In other implementations, the user signals received from the user device may be electromyography ("EMG") signals, which are recordings of electrical activity when muscles of a body are activated, electrooculography ("EOG") signals, which are recordings of electrical activity resultant from eye movement of an eye of a body, or any combination of EEG, EMG, and/or EOG.

In some examples, the disclosed implementations may receive and record an authentication signal that the user may later utilize to authenticate themself. For example, an auditory output may be presented to a user and the electrical activity detected from the brain of the user in response to the auditory output may be recorded and used as an authentication signal. For example, electrical activity detected from the brain of the user in response to the user performing a specific mental exercise (e.g., performing a mental mathematical calculation, thinking of a certain event or activity, etc.) may be recorded and used as an authentication signal, electrical activity of the user generated in response to the user performing a series of eye movements (e.g., looking left, right, up, down, right), muscle contractions/movements (e.g., clicking tongue, wiggling ears, opening/closing jaw), or any combination thereof may be recorded and used an authentication signal, etc. Once recorded, the authentication signal may be subsequently performed or produced by the user to uniquely identify the user. As discussed further below, such authentication may be used for a variety of purposes. For example, the authentication may be provided to another device to authenticate the user so the other device will provide the user with access to confidential information of the user (e.g., bank account information), to control the device and/or other devices (e.g., to personalize music, unlock a door/device, turn on an automobile, control lights, temperature, etc.), send or receive a call, etc.

In still other examples, a user may define or select a number of triggers that, when detected, will cause an audible presentation of two or more options. The user may then focus their attention on one of the audibly presented options and the disclosed implementations, as discussed further below, may determine from the user signal(s) received in response to the auditory presentation, the option focused upon by the user, and cause one or more corresponding actions to be performed. Triggers, as discussed further below, may be user signals defined by the user that, when detected by the disclosed implementations, cause the audible presentation of options. For example, a user may define a trigger, such as a user signal generated by the brain of the user when the user performs a mental mathematical calculation, and associate two or more options that are to be audibly presented when the user signal (trigger) is detected. As other examples, triggers may be a time of day, a day of week, a calendar event, receipt of an email, text message, phone call, or other event or activity for which a user may desire to select from two or more options.

Figure 9:
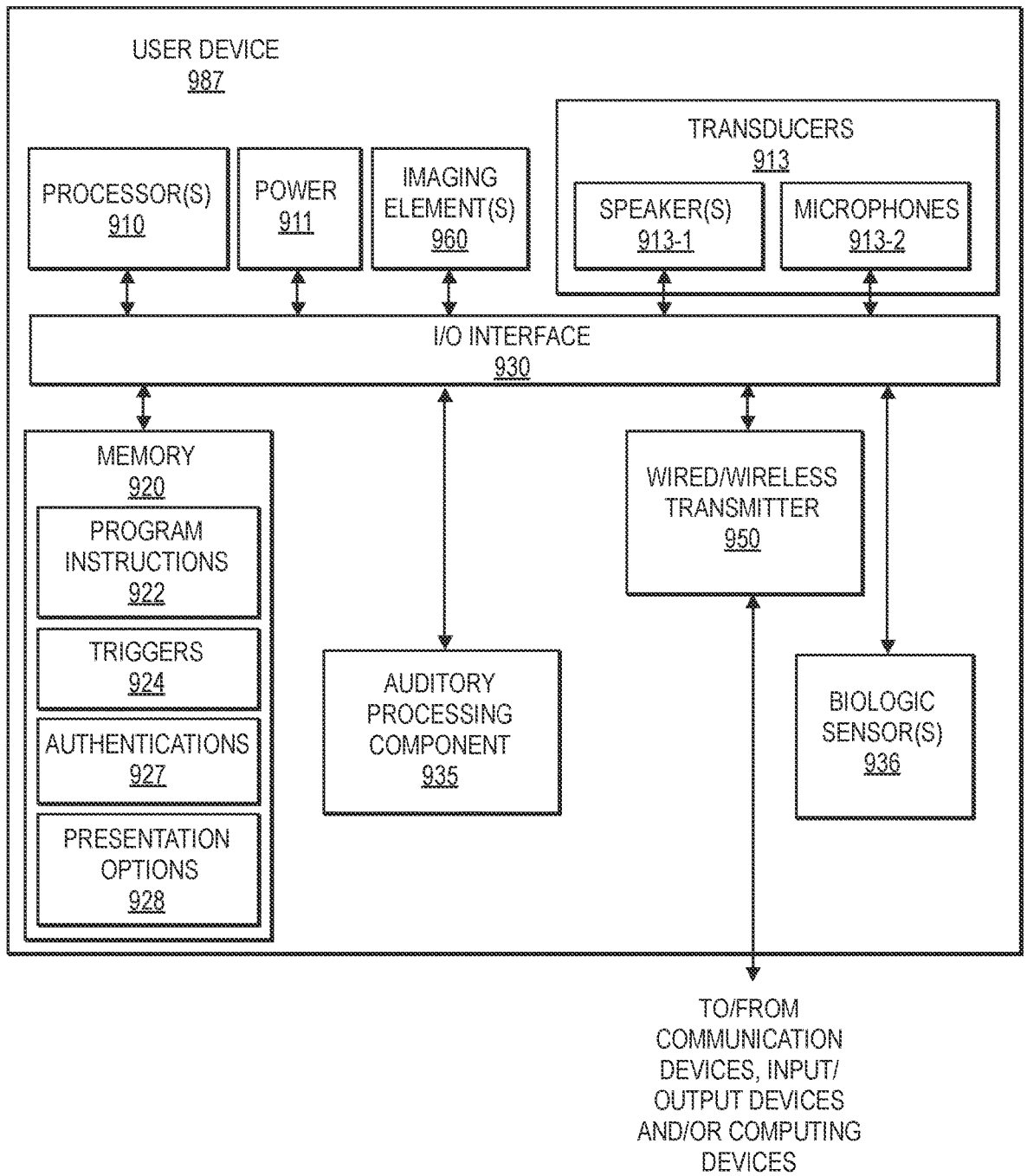
FIG. 9 is a block diagram illustrating components of an example user device, in accordance with implementations of the present disclosure.

The user device, as discussed further below, may be any form of user device that includes one or more sensors (e.g., electrodes) that, when worn, attached, or otherwise coupled to a body of a user, are able to record EEG, EMG, EOG signals, and/or other electrical activity of different parts or all of the body of the user, often referred to as electrodes. In some examples, the user device may include glasses, earbuds, earmuffs, a headband, a hat, etc. FIG. 9 includes additional details of an example user device. In addition, and as discussed below, in some implementations the audio may be presented by a device that is independent of the user device. Likewise, the user device may communicate with other devices.

FIG. 1 is an example auditory presentation process 100, in accordance with implementations of the present disclosure.

The example process 100 begins upon detection of a trigger, as in 200. Trigger detection is discussed below with respect to FIG. 2.

Upon detection of a trigger, two or more options associated with the trigger are determined, as in 102. As discussed below, a user may specify any number of options that are to be audibly presented in response to a detected trigger. Likewise, in some implementations, some triggers may be predefined and have predefined (and optionally user adjustable) options. For example, an incoming call from an unknown caller may be a predefined trigger that results in the audible presentation of the options-"answer," "reject," "send to voicemail," or "block." In other examples, the trigger may have user defined options. For example, if the call is from a co-worker, the user may have previously defined options of "answer," "reject," "send to voicemail," or "send message—In a meeting. I'll call you later," each of which may be audibly presented to the user, in accordance with the disclosed implementations. In still other examples, an option associated with a trigger may be a series of nested or dependent options, each of which when selected by the user result in the additional audible presentation of other options. For example, an audible presentation of the option "send a text message" that is presented in response to a trigger of an incoming telephone call from a spouse may, upon selection by the user, result in the audible presentation of a different user defined and/or predefined text messages such as, for example, "I'll call you back," or "In a meeting, what's up?". In accordance with the disclosed implementations, the user signals received from the user device in response to audible presentation of the options, presented in accordance with the disclosed implementations, may be used to determine the selection of an option intended by the user and the occurrence of the action associated with the selected option, in this example, delivery of the selected text message.

As still another example, a trigger may be another activity or engagement by the user with another device. For example, if the user interacts with another device, such as a speech-controlled device, and instructs the device to begin playing music, such an instruction may be a trigger that results in the audible presentation of options "change station," "adjust volume up," "adjust volume down," and "stop." Upon audible presentation of the options, whether audibly presented by the speech controlled device or the user device, user signals from one or more sensors of the user device may be received and processed to determine if the user desires to select one of the audibly presented options.

In addition to determination of the options associated with the detected trigger, one or more presentation characteristics that are to be used to audibly present the options may be selected, as in 104. Presentation characteristics may be any characteristics that are applied to the audible presentation of one or more of the options to help aid the user in distinguishing different options and mentally focusing on a desired option and/or gaze in a spatial direction of a desired option. Presentation characteristics my include but are not limited to one or more of a concurrency as to which or how much of each option is to be concurrently presented, a tone of the audible presentation, a volume of the audible presentation, a language of the audible presentation, a dialect of the audible presentation, a cadence of the audible presentation, a pitch of the audible presentation, a frequency of the audible presentation, or a spatial direction of the audible presentation.

The options may then be audibly presented to the user according to the selected presentation characteristics, as in 106. In some implementations, in particular when EEG signals are being utilized as the user signals, at least a portion of two or more of the presentation characteristics may be audibly presented concurrently to the user. For example, if there are four different options (e.g., "answer," "send to voicemail," "reject," "ignore"), each of the options may be audibly presented concurrently to the user for selection by the user mentally focusing on the desired option as it is audibly presented and/or by the user gazing in a spatial direction of the desired option as the desired option is audibly presented. In some implementations, each of the different options may be presented with different characteristics, such as different voices, different pitches, tones, languages, presented in different spatial directions, etc. Concurrently presenting multiple options, especially with different presentation characteristics, may aid the user in focusing on a desired option and subsequent determination of the desired option, as discussed further below.

In some implementations, there may be one or more options that are not audibly presented to the user but may be selected by the user thinking of the option, referred to herein as standard options. Continuing with the above example, the four above-identified options may be audibly presented to the user but there may also be the standard options of "cancel" or "ignore" that are associated with the trigger and available for selection by the user but not audibly presented to the user. For example, rather than the user focusing their attention on one of the audibly presented options, the user may focus their attention or think about one of the standard options, even though the standard option may not be audibly presented.

As the options are audibly presented to the user, a user signal generated from electrical activity collected by one or more sensors of the wearable device worn by or otherwise coupled to the user is received, as in 108. As discussed above, the user signal may be an EEG signal indicative of electrical activity of the brain of the user in response to the audible presentation, an EMG signal indicative of electrical activity resultant from muscle activity of the body of the user generated in response to the audible presentation, an EOG signal indicative of electrical activity resultant from eye movement of the eye of the body in response to the audible presentation, and/or any combination thereof. In some implementations, graze tracking determined from processing of image data received from an imaging device of the user device may also be used to determine eye movement.

The option probability score determination process may then be performed with respect to the received user signal to determine probability scores for each presented option or standard option associated with the trigger, the probability scores indicative of a probability that the user was mentally focusing on the option when the options were presented and/or gazing in the spatial direction of the option when audibly presented, as in 500. The option probability score determination process is discussed further below with respect to FIG. 5.

Based on the obtained probability scores for each presented option or standard option, a confidence score is determined for the option with the best probability, as in 110. For example, the confidence score may be determined based on the probability score of the highest scoring option and the probability scores of other high scoring options. For example, if the option with the highest probability score has a probability score of 94% and the next highest probability scores are 32% and 38%, the option with the highest probability score will receive a high confidence score because it is unlikely that any of the other options were intended to be selected by the user. In comparison, if the three highest probability scores for options are 94%, 93%, 92%, the option with the highest probability score will receive a low confidence score, because any of the options with high probability scores may have been the option upon which the user was focusing for selection and therefore, it cannot be determined with high confidence which option was intended for selection by the user. In other implementations, the best probability score may be different than the highest probability score and any type of scoring or rating structure may be used to determine a probability score.

A determination is then made as to whether the confidence score for the option with the best probability score satisfies a selection threshold, as in 112. If the confidence score satisfies the selection threshold, the option with the best confidence score is selected and the one or more actions associated with that option are performed or caused to be performed, as in 116.

If it is determined that the confidence score does not satisfy the selection threshold, it may be determined whether audible presentation of the options is to continue, as in 114. If it is determined that audible presentation of the options is to continue, the example process 100 returns to block 106 and continues. In some implementations, different presentation characteristics may be selected for some or all of the options, the order of audible presentation of some or all of the options may be modified, etc. In some examples, if there were options with low probability scores, some or all of those options may be removed from audible presentation. Still further, in some implementations, one or more standard options may be audibly presented, for example, if a standard option that was not previously audibly presented is determined to have a high or best probability score.

If it is determined at decision block 114 that audible presentation of options is not to continue, one or more of the options with the best probability scores may be presented to the user for selection, as in 118. In some examples, the option with the best probability score may be visually, audibly, and/or otherwise presented and the user may provide a physical motion-based selection, a verbal selection, and/or a motion selection (e.g., head nod, gesture), or other form of input to confirm selection of the presented option.

After presenting the option with the best probability score for confirmation by the user as the intended option, it may be determined if a user confirmation was received, as in 120. If it is determined at decision block 120 that a user confirmation was not received and/or if the user indicated that the presented option was not the intended option, the option with the next best probability score may be selected and presented, as in 122. After presenting the next best option at block 122, the example process 100 returns to decision block 120 and continues. The process of selecting and presenting options based on the determined probability scores may continue until selection/confirmation of the intended option is received from the user.

Upon receipt of a confirmation by the user of the intended option, the one or more actions associated with the selected/confirmed option are performed or caused to be performed, as in 116.

Figure 2:
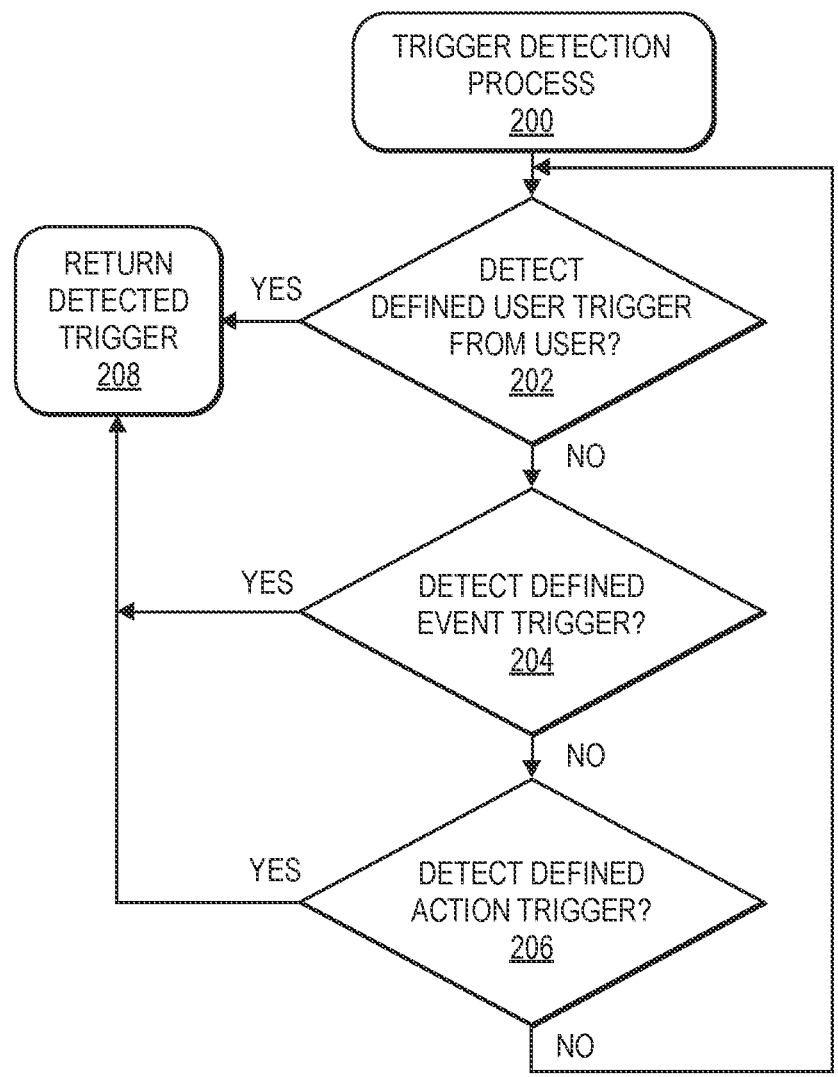
FIG. 2 is an example trigger detection process, in accordance with implementations of the present disclosure.

FIG. 2 is an example trigger detection process 200, in accordance with implementations of the present disclosure. As mentioned above, the example process 100 (FIG. 1) begins upon detection of a trigger. A trigger, as used herein, may be any form of input that, upon detection, causes the example process 100 to begin. For example, a trigger may be a defined user trigger (e.g., specific eye movement pattern, mental thought, gesture, user interaction with a speech-controlled device, etc.), a defined event trigger (e.g., start of a meeting, time of day, day of week, user location, etc.), a defined action trigger (e.g., incoming telephone call, incoming text message, etc.), etc.

While the examples discussed with respect to FIG. 2 describe defined user triggers, defined event triggers, and defined action triggers, these are provided for explanation purposes only and are not intended to be limiting. Accordingly, the disclosed implementations cover any type of trigger that, upon detection, may be used to initiate the example process 100 discussed above with respect to FIG. 1. In addition, while the example process 200 indicates detection of different types of triggers in a series, it will be appreciated that some or all of the example process 200 may be performed in parallel.

The example process 200, in this example, begins by determining whether a defined user trigger is detected, as in 202. A defined user trigger may be any action, activity, motion, mental thought, etc., performed by the user. For example, a defined user trigger may be a specific eye movement pattern of the user, a specific tongue movement pattern of the user, a specific jaw movement pattern of the user, electrical activity of the brain of the user that occurs in response to the user performing a mental exercise (e.g., mentally solving a mathematical equation), a specific interaction or instruction between the user and a speech-controlled device, etc. If it is determined that a defined user trigger is detected, the detected trigger is returned, as in 208.

If a defined user trigger is not detected, the example process determines if a defined event trigger is detected, as in 204. As noted above, a defined event trigger may be associated with any event. Events include, but are not limited to, the start of a meeting, the end of the meeting, the time of day, the day of the week, a holiday, etc. If it is determined that an event trigger is detected at decision block 204, the example process 200 returns the detected trigger, as in 208.

If a defined event trigger is not detected, the example process 200 determines if a defined action trigger is detected, as in 206. As noted above, a defined action trigger may be associated with any action. Actions include, but are not limited to, an incoming phone call, an incoming text message, an email message, etc. If it is determined that a defined action trigger is detected at decision block 206, the example process 200 returns the detected trigger, as in 208.

Figure 3:
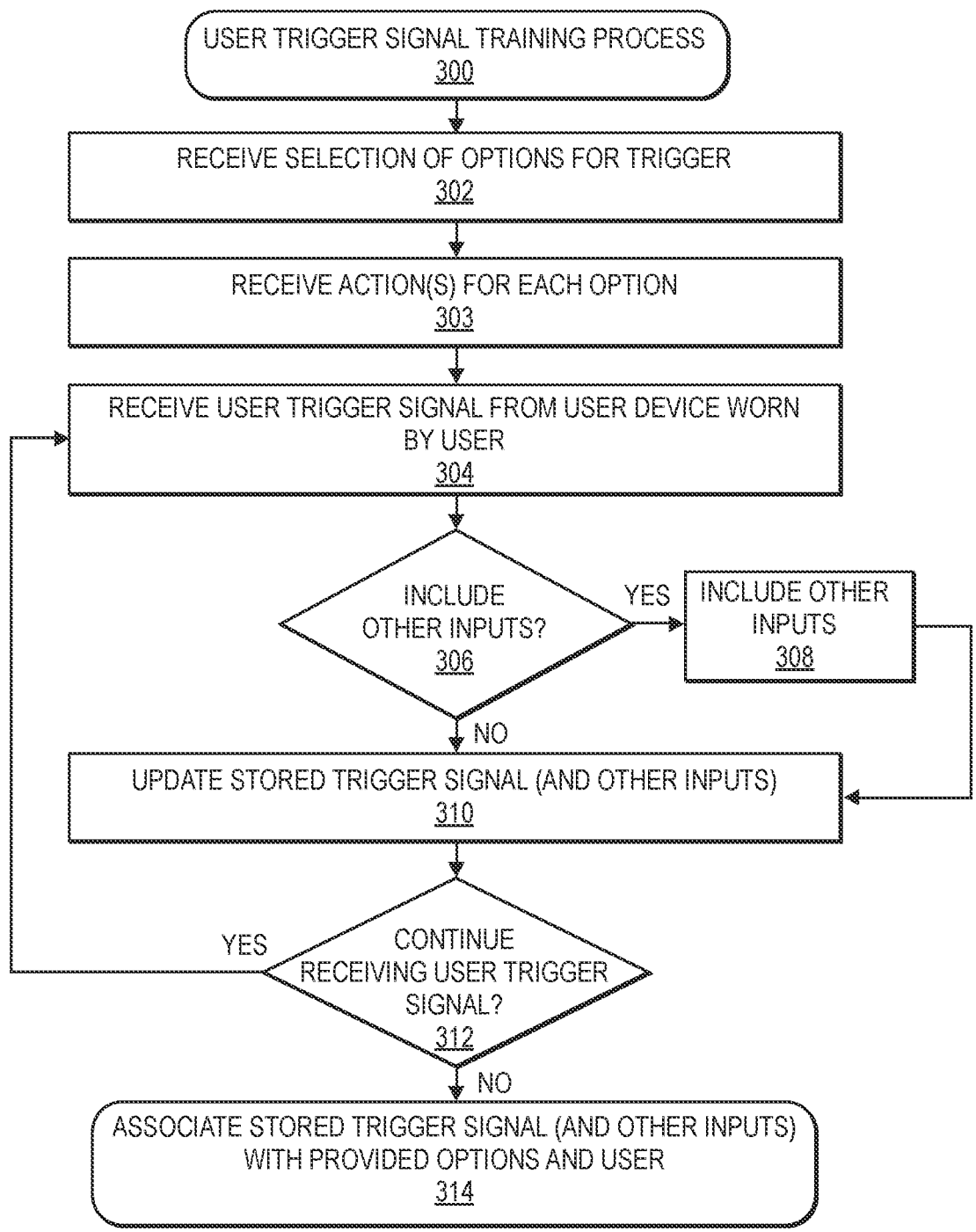
FIG. 3 is an example user trigger signal training process, in accordance with implementations of the present disclosure.

FIG. 3 is an example user trigger signal training process 300, in accordance with implementations of the present disclosure. As noted above, a user may define any number and type of triggers that may be utilized with the disclosed implementations.

The example process 300 begins by receiving a selection of options for a trigger, as in 302. Options may be any output that can be audibly presented to a user and upon which the user may focus their brain/attention and/or gaze direction to cause a selection of one of the presented options. For example, options may include one or more of a word, a plurality of words, a phrase, a sentence, an audible tone, a series of audible tones, etc. As noted above, in some implementations, one or more standard options that may not be initially audibly presented may also be specified and associated with a trigger.

For each option, the user may also provide one or more actions that are to be performed upon determination that a presented option has been selected, as in 303. In some implementations, a single action may be performed upon selection of an option. In other implementations, a plurality of actions may be performed upon selection of an option. Still further, in some implementations, selection of an option may result in the presentation of additional options. For example, if the presented option is the phrase "send a text message," upon detection of electrical signals indicating the user is focusing on that presented option and/or gazing in the spatial direction of that presented option, the disclosed implementations may audibly present additional options for selection by the user. Examples of additional options may include, but are not limited to, in this example, "I'm in a meeting. Will call you later," "I'm busy, what's up?" "Is it urgent?", etc. In such an example, the user may then focus on/gaze in the direction of one or more of the additional options that are audibly presented to the user to cause electrical activity to be received and utilized to determine the additional option upon that is to be selected.

As part of defining a user trigger, the user may also provide a trigger signal that, upon detection, causes the defined user trigger to be invoked, as in 304. As noted above, a defined user trigger, may be any input that is detectable. For example, a defined user trigger may be electrical activity of the brain resulting from the user mentally performing a mathematical calculation, or other mental exercise, electrical activity resulting from eye movement of an eye of the user, electrical activity resulting from muscle activity of one or more muscles of the user, a specific interaction between the user and another device, such as a speech-controlled device, etc.

In some implementations, a determination may also be made as to whether other inputs are to be considered in determining if a defined user trigger signal has been received, as in 306. Other inputs may include, but are not limited to, physical motion-based inputs of the user, verbal inputs of the user, mental inputs of the user, etc. For example, a defined user trigger signal may include electrical activity resulting from the brain of the user when performing a mental exercise along with the other input of the user clicking their tongue. If it is determined that other inputs are to be included, the other inputs are added to the received user trigger signal, as in 308. After including the other inputs at block 308, or if it is determined that other inputs are not to be included at decision block 306, the user trigger signal and optionally other inputs are stored in a memory of the user device, as in 310. If the example process 300 has been performed multiple times for training a user trigger signal, the stored trigger signal may be updated with the additional receipt of the user trigger signal. As will be appreciated, the user trigger signal received from the wearable device worn by or otherwise coupled to the user may be received multiple times as part of the example training process 300. With each receipt of the user trigger signal, the stored user trigger signal may be updated to produce a combined user trigger signal, thereby increasing reliability and robustness. For example, each received trigger signal may be averaged to generate a combined user trigger signal.

A determination may then be made as to whether the user trigger signal is to continue to be received as part of the example process 300, as in 312. If it is determined that the user trigger signal is to be again received as part of the training process, the example process 300 returns to block 304 and continues. In some implementations, the example process 300 may be performed a defined number of times such that the user trigger signal is received from the wearable device multiple times. Each receipt of the user trigger signal may then be combined to create a stored user trigger signal. In other implementations, each time the user trigger signal is received, it may be compared to the stored user trigger signal to determine differences between the two signals. If the difference satisfies a threshold, the received user trigger signal may be combined with the stored user trigger signal to update the stored user trigger signal. In comparison, if the difference does not satisfy the threshold, it may be determined that the stored user trigger signal has been updated a sufficient number of times to ensure accurate detection.

If it is determined that the user trigger signal is not to be again received at decision block 312, the stored user trigger signal, and optionally other inputs, are associated with the provided options and the user, as in 314.

Figure 4A:
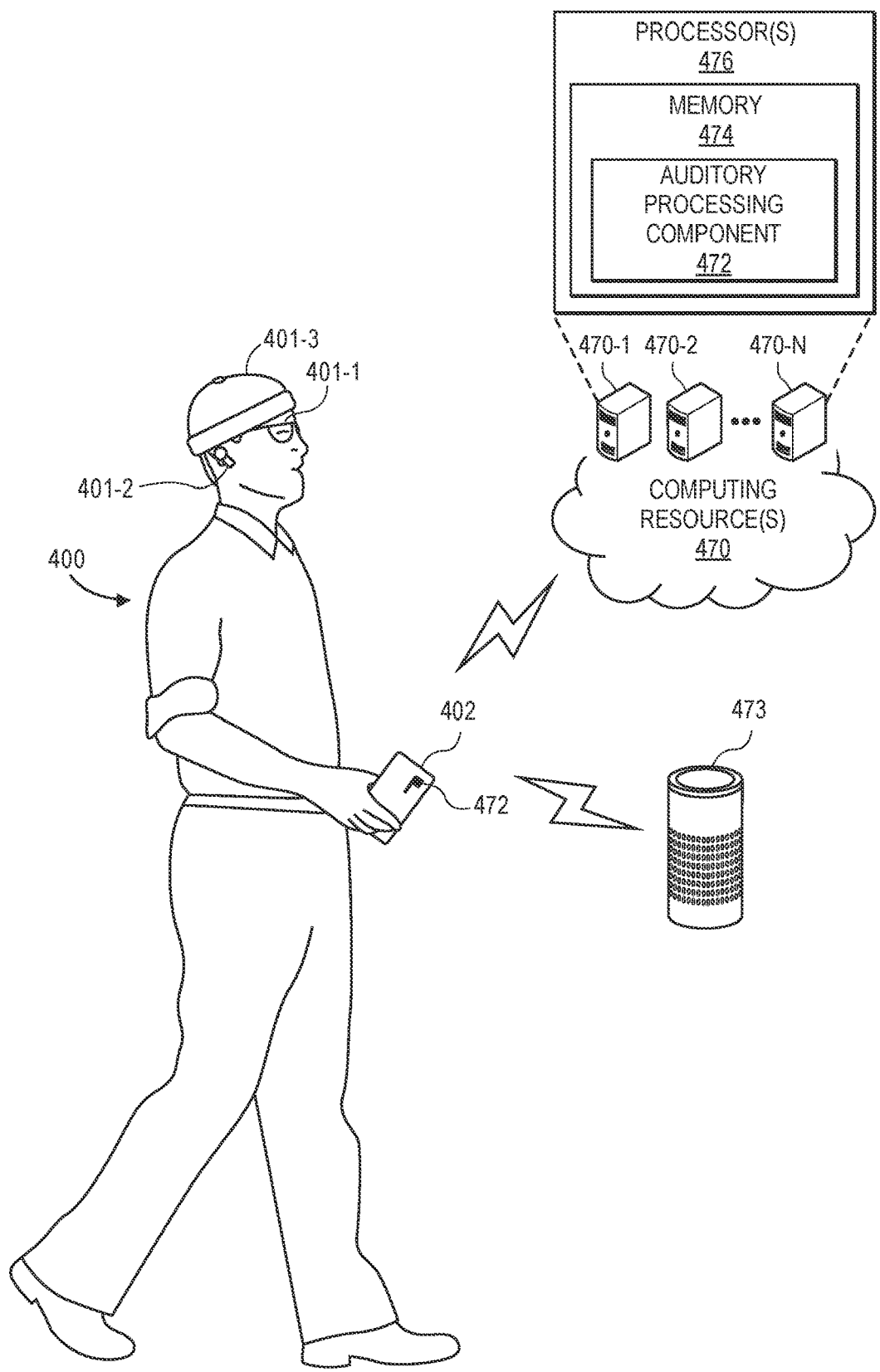
FIG. 4A is an example illustration of a body of a user with various user devices that may be utilized in accordance with implementations of the present disclosure.

FIG. 4A is an example illustration of a body 400 of a user with various user devices 401-1, 401-2, 401-3, that may be utilized in accordance with implementations of the present disclosure. As noted above, the user device 401 may be any device that includes one or more sensors that, when the device is worn by or otherwise coupled to the user, the sensor is able to collect electrical activity, such as electrical brain activity, electrical activity indicative of eye movement, electrical activity resulting from muscle movement, etc. For example, the user device 401-1 may be a pair of glasses that include one or more sensors that are positioned to collect electrical activity near the user's eyes, temple, ears, etc. As another example, the user device 401-2 is an earbud that, when worn by or otherwise coupled to the user, is able to collect electrical activity measured in or around the ear. As still another example, the user device 401-3 may be a hat that includes one or more sensors such that when the user device 401-3 is worn by or otherwise coupled to the user, the sensors of the user device 401-3 are able to collect electrical activity generated by the brain, eye movement, and or muscle movement of the body 400 of the user.

In some implementations, a user device 401, in accordance with the disclosed implementations, may communicate with one or more of a portable device 402 of the user, a speech-controlled device 473, one or more remote computing resources 470, etc. For example, the user device 401 worn or otherwise coupled to the body 400 of the user may wirelessly communicate with the portable device 402 and/or the speech-controlled device 473 and provide sensor data, also referred to herein as user signals, that are indicative of electrical activity collected by the one or more sensors of the user device 401. Alternatively, or in addition thereto, the user device 401 worn on or otherwise coupled to the body 400 of the user may also communicate with computing resources 470 and provide sensor data/user signals that are collected by the one or more sensors of the user device 401. As still another example, the user device 401 may communicate with and/or receive instructions from a speech-controlled device 473. For example, in response to the user interacting with the speech-controlled device 473, the speech-controlled device may send an instruction to the user device 402 to collect and provide user signals detected in response to an auditory presentation (which may be presented by the user device 402 and/or the speech-controlled device 473).

The computing resource(s) 470 may be remote from the user, user devices, portable devices, etc. As illustrated, the computing resource(s) 470 may be implemented as one or more servers 470(1), 470(2), . . . , 470(N) and may, in some instances, form a portion of a network-accessible computing platform implemented as a computing infrastructure of processors, storage, software, data access, and so forth that is maintained and accessible by components/devices of the system via a network, such as an intranet (e.g., local area network), the Internet, etc.

The computing resource(s) 470, in some embodiments, do not require end-user knowledge of the physical location and configuration of the system that delivers the services. Common expressions for these remote computing resource(s) 470 can include "on-demand computing," "software as a service (Saas)," "platform computing," "network-accessible platform," "cloud services," "data centers," and so forth. Each of the servers 470(1)-(N) may include one or more processors 476 and memory 474, which may store or otherwise have access to an auditory processing component 472 that is operable to perform some or all of the implementations discussed herein. In other implementations, the user device(s) 401 may communicate with the portable device 402 of the user and the portable device 402 may include the auditory processing component 472 that performs some or all of the implementations discussed herein. In still other examples, all processing and performance of the disclosed implementations may be performed directly on the user device. In still other examples, processing and performance of one or more of the disclosed implementations may be distributed across two or more of the user device 401, portable device 402, and the remote computing resource(s) 470(1)-(N).

The network through which the user device 401, portable device 402, speech-controlled device 473 and/or the computing resource(s) 470(1)-(N) may communicate, and each of the other networks discussed herein, may utilize wired technologies (e.g., wires, USB, fiberoptic cable, etc.), wireless technologies (e.g., radio frequency, infrared, NFC, cellular, satellite, Bluetooth, etc.), or other connection technologies. The network may be representative of any type of communication network, including data and/or voice network, and may be implemented using wired infrastructure (e.g., cable, CAT6, fiberoptic cable, etc.), a wireless infrastructure (e.g., RF, cellular, microwave, satellite, Bluetooth, etc.), and/or other connection technologies.

In some implementations, the user device worn on or otherwise coupled to the body 400 of the user may also include one or more transducers, such as speakers, that may be used to output audible options and/or triggers to the user. In other examples, options may be audibly presented to the user via a first user device worn by or otherwise coupled to the user while a second wearable device worn by or otherwise coupled to the user may be utilized to collect sensor data indicative of electrical activity generated in response to the audible presentations. In still other examples, the audible options may be presented by the portable device 402, the speech-controlled device 473, and/or another device.

Figure 4B:
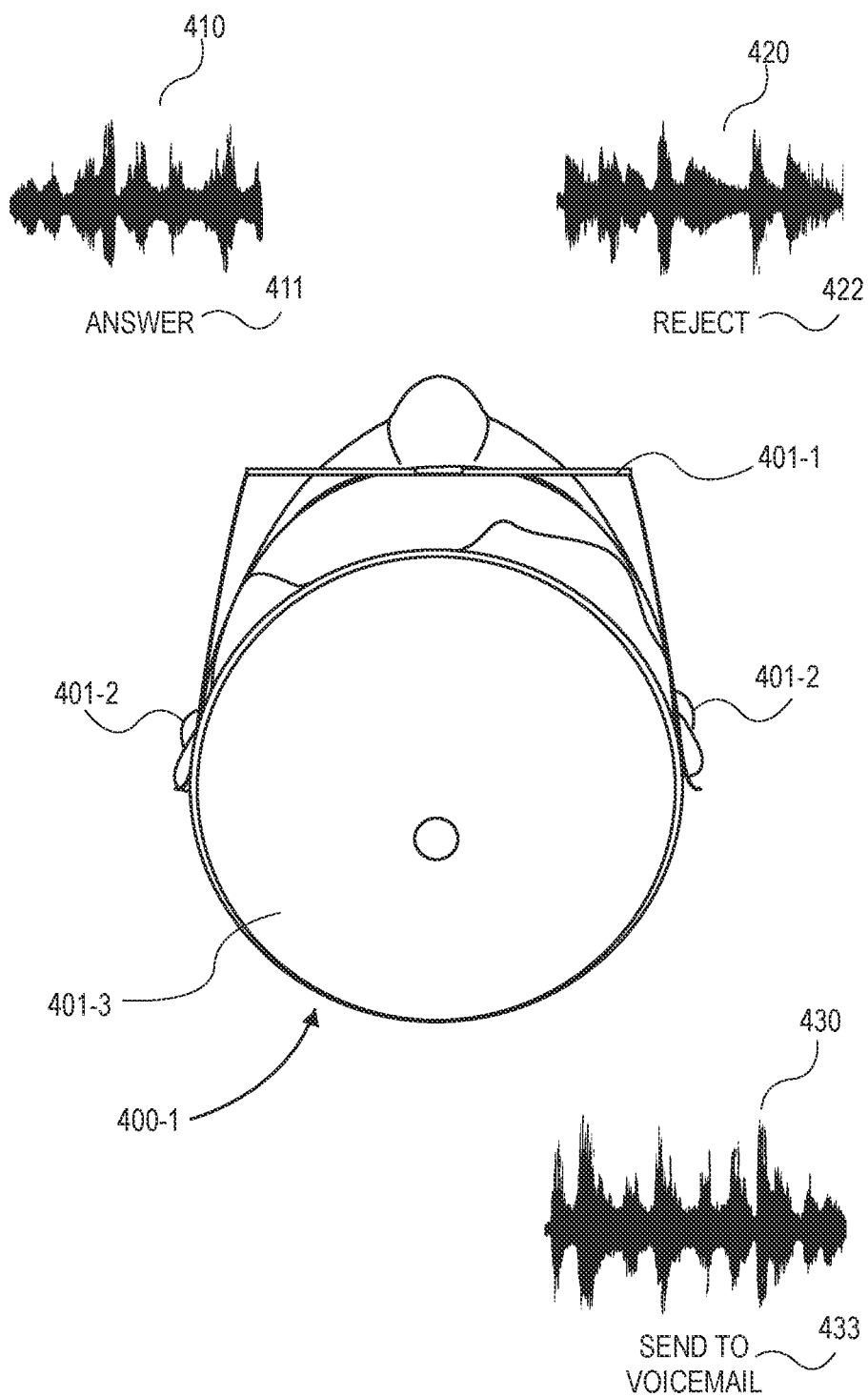
FIG. 4B is an example illustration of auditory presentation of multiple options, each option presented concurrently and in different spatial directions with respect to a head of the user, in accordance with implementations of the present disclosure.

FIG. 4B is an example illustration of auditory signals 410, 420, 430 representative of multiple options 411, 422, 433, each presented concurrently and in different spatial directions with respect to a head 400-1 of the body 400 of the user, in accordance with implementations of the present disclosure.

In this example, the audio signals 410, 420, 430, which correspond or represent the options 411, 422, 433, are audibly presented to the user through the ear buds 401-2. As illustrated, the options 411, 422, 433, presented through output of the audio signals 410, 420, 430, are audibly presented in different spatial directions with respect to the head 400-1 of the body 400 of the user. For example, head-related transfer functions and binaural room impulse responses may be utilized to externalize the spatial direction of each audio signal 410, 420, 430 output of each option 411, 422, 433 with respect to the head 400-1 of the body 400 of the user. In this example, the audio signal 410 of the option "answer" 411 is audibly presented to the front and left of the user's head 400-1, the audio signal 420 of the option "reject" 422 is audibly output to the front and right of the user's head 400-1, and the audio signal 430 of the option "send to voicemail" 433 is audibly output to the rear and right of the user's head 400-1. As will be appreciated, the spatial direction of the audible outputs of the options may be in any direction with respect to the head of the user and these are provided only as examples. Audibly outputting options in different spatial directions with respect to the head of the user 400-1 may be useful in helping the user focus their mental attention toward a particular option and/or gaze in a spatial direction of a particular option. As discussed above, the audible output of options may be repeated multiple times until the disclosed implementations are able to determine upon which option the user is focusing their attention/directing their gaze. For example, audio signals 410, 420, 430 for each of the options 411, 422, 433 may be audibly output multiple times to the user while a user signal is recorded from sensors of a wearable device 401 worn by or otherwise coupled to the user and processed to determine upon which option (audibly presented option or standard option) the user is focusing their attention and/or in which spatial direction the user is focusing their gaze.

Figure 4C:
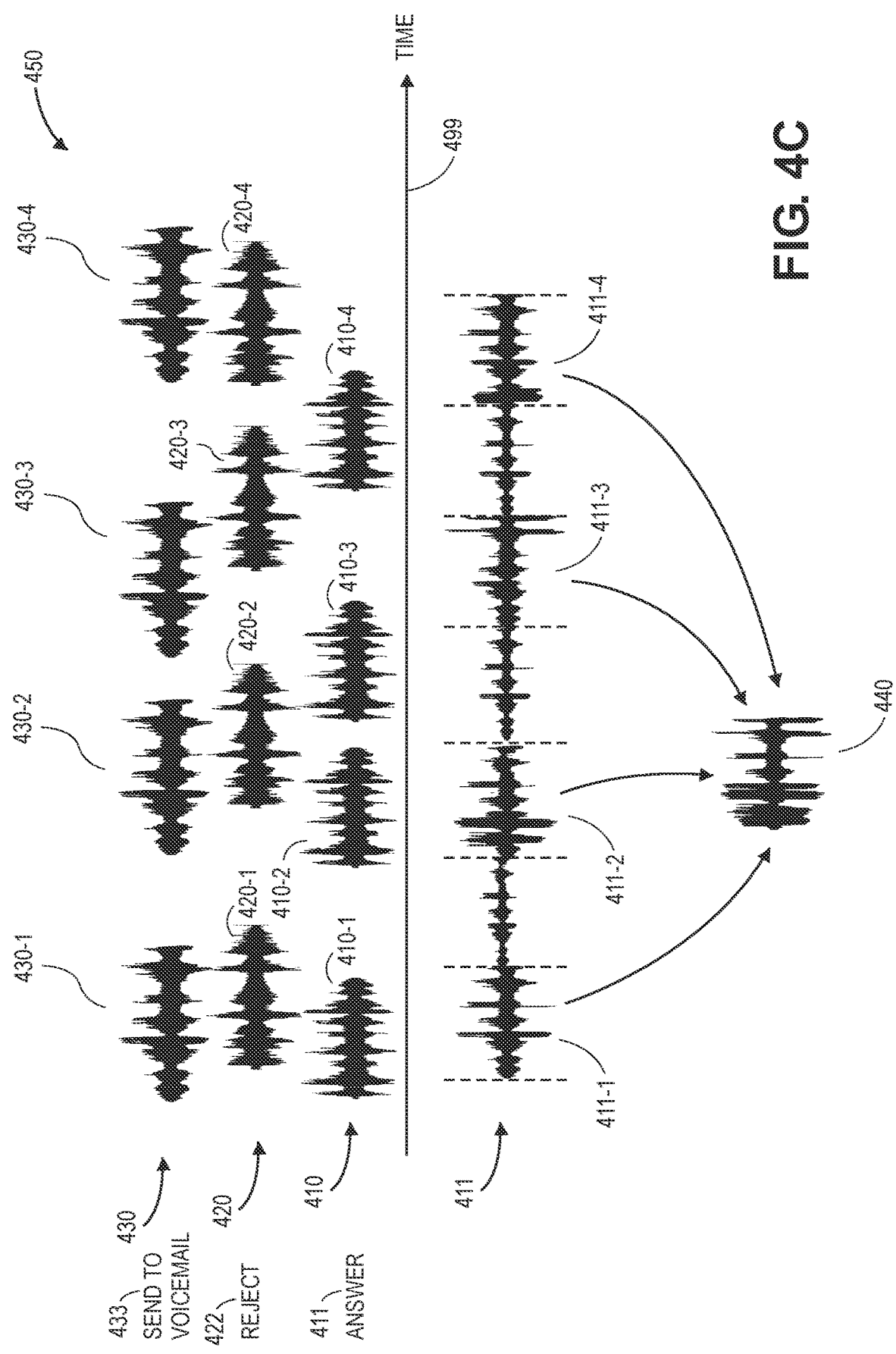
FIG. 4C is an example illustration of an auditory presentation of multiple options, the collection of user signals in response to the auditory presentations, and the generation of a combined user signal, in accordance with implementations of the present disclosure.

FIG. 4C is an example illustration of an auditory presentation 450 of multiple options 411, 422, 433, the collection of a user signal 411 in response to the auditory presentation 450, and the generation of a combined user signal 440, in accordance with implementations of the present disclosure.

As illustrated, in response to detection of a trigger, one or more options 411, 422, 433 that may be selected can correspond to the detected trigger and audio signals 410, 420, 430 for those options are audibly presented to a user over a period of time 499. In addition, as discussed above, in some implementations, at least a portion of two or more of the audio signals 410, 420, 430 of different options 411, 422, 433 may be output concurrently. Likewise, the audio signals of some or all of the options may be audibly output multiple times during the period of time 499. In the example illustrated with respect to FIG. 4C, the option 411 is audibly output four times during the period of time 499 as audio signals 410-1, 410-2, 410-3, 410-4, the option 422 is also audibly output four times during the period of time 499 as audio signals 420-1, 420-2, 420-3, 420-4, and the option 433 is audibly output four times during the period of time 499 as audio signals 430-1, 430-2, 430-3, 430-4. In addition, as illustrated, during each audible output two or more of the audio signals 410, 420, 430 are audibly output concurrently so that the audible outputs are heard at the same time by the user as part of the audible presentation 450. For example, at the beginning of the audible presentation 450, a first portion of the audio signal 410-1 is concurrently output with a second portion of the audio signal 420-1 and with a third portion of the audio signal 430-1 such that each of the options 411, 422, 433 are at least partially concurrently audibly output to the user. Likewise, some or all of the currently presented audio signals 410-1, 420-1, 430-1 may be output in different spatial directions. Likewise, as discussed, some or all of the options 411, 422, 433 may be audibly output 410, 420, 430 with different presentation characteristics, a different number of times during the audible presentation 450, with different overlaps of concurrent audible outputs, etc.

During the audible presentation 450, a user signal 411 is received that is indicative of electrical activity of the body (e.g., brain, eye movement, muscle movement) generated in response to the audible presentation 450. The user signal 411 may be processed to determine segments 411-1, 411-2, 411-3, 411-4 of the user signal 411 that are indicative of electrical activity of the body when the user is focusing their attention on one or more of the audibly presented options 411, 422, 433. As the user signal is processed, the determined segments may be combined to generate a combined user signal 440. For example, the segments 411-1, 411-2, 411-3, 411-4 may be averaged to generate the combined user signal 440. As discussed further below, the combined user signal 440 may be compared with stored audible outputs 410, 420, 430 of the options 411, 422, 433 to determine upon which option 411, 422, 433 the user is focusing their attention.

Figure 4D:
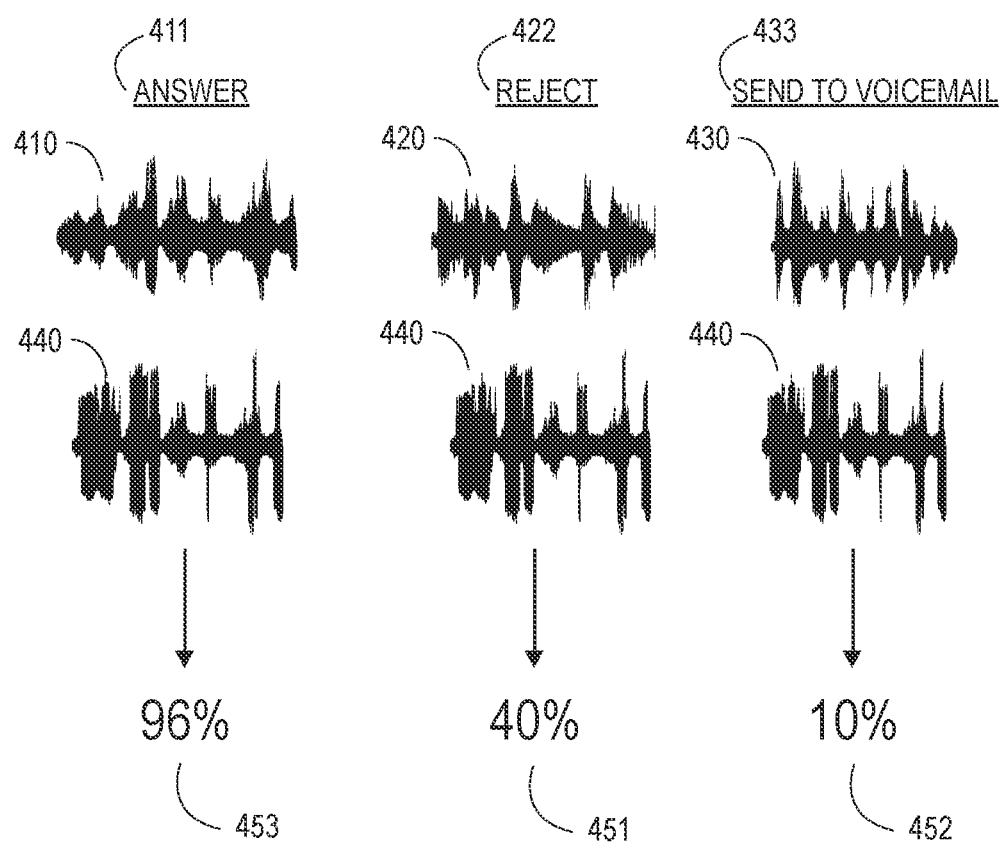
FIG. 4D is an example illustration of comparison of a combined user signal with stored signals of options to determine an option having a best probability score, in accordance with implementations of the present disclosure.

FIG. 4D is an example illustration of a comparison of a combined user signal 440 with stored audible outputs 410, 420, 430 of options 411, 422, 433 to determine a probability score for each option, in accordance with implementations of the present disclosure.

As illustrated, the combined user signal 440 may be compared with the stored audible output 410, 420, 430 of each of the options 411, 422, 433 that were audibly presented to a user in response to a trigger to determine corresponding probability scores 453, 451, 452, each probability score 453, 451, 452 indicative of a similarity between the stored audible output 410, 420, 430 and the combined user signal 440 and indicative of a likelihood that the user was focusing their attention on that option. Likewise, in implementations that include standard options that are not audibly output but available for selection, the combined user signal may be compared with a stored representation of the standard option to determine a corresponding probability score.

In the example illustrated with respect to FIG. 4D, it is determined from a comparison of the stored audible output 410 with the combined user signal 440 that there is a probability score 453 of 96% that the user was focusing their attention on the option "answer" 411. In comparison, a probability score 451 of 40% is determined based on a comparison of the stored audible output 420 with the combined user signal 440, thereby indicating a lower probability that the user was focusing their attention on the option "reject" 422. Likewise, a probability score 452 of 10% is determined based on a comparison of the stored audible output 430 with the combined user signal 440 for the option of "send to voicemail" 433.

In some implementations, a deep neural network ("DNN"), such as a convolution on neural network, may be trained to generate the combined user signal and/or to compare a combined user signal with each of the stored audio signals to determine the probability scores. In other examples, one or more of a linear classification model, stimulus reconstruction model, canonical correlation analysis, etc., may be utilized to determine probability scores.

Figure 5:
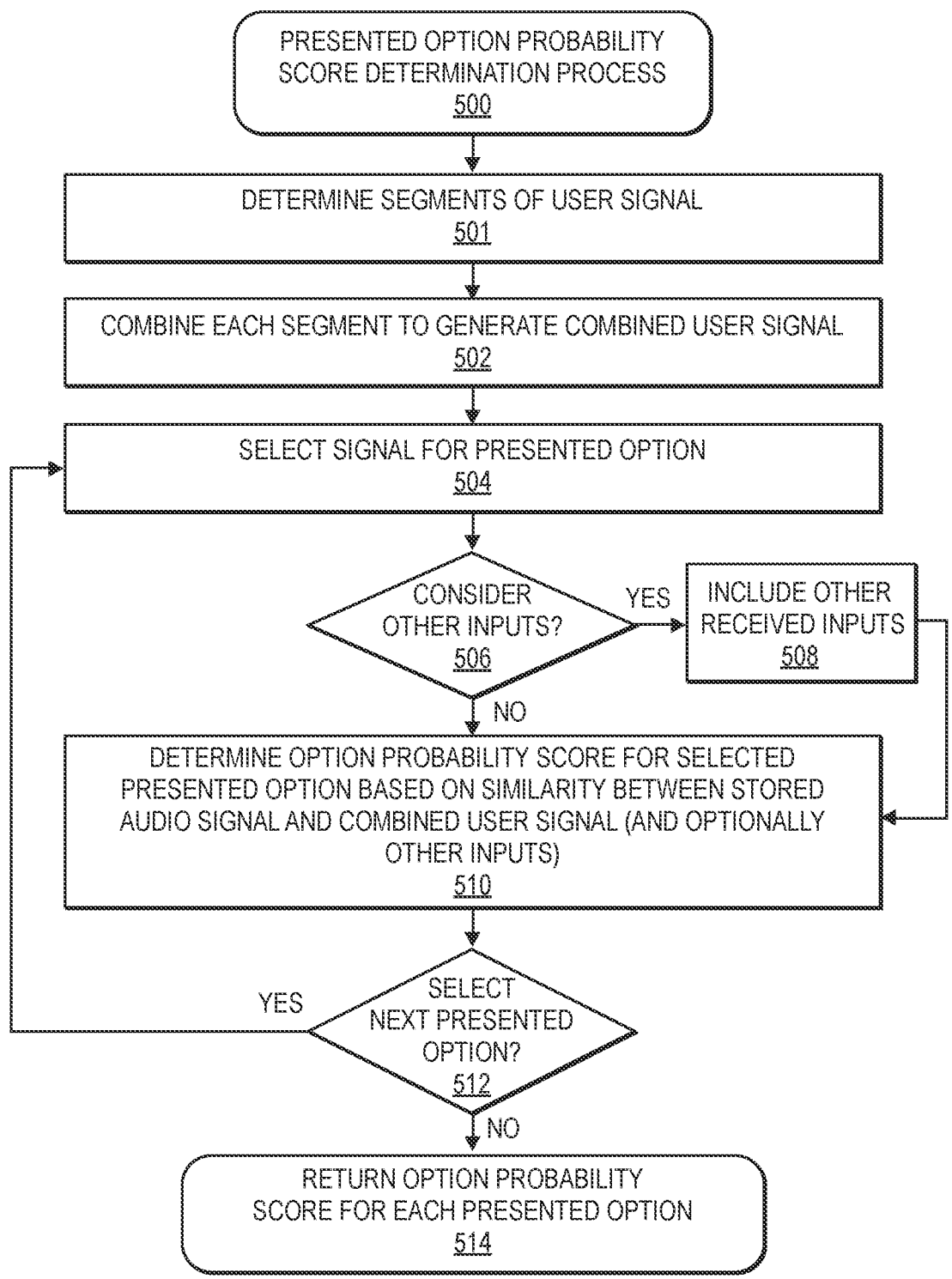
FIG. 5 is an example presented option probability score determination process, in accordance with implementations of the present disclosure.

FIG. 5 is an example presented option probability score determination process 500, in accordance with implementations of the present disclosure.

The example process 500 begins by determining segments of the user signal that is received in response to an audible presentation that includes two or more options, as in 501. As discussed above, the user signal may be processed to identify segments of the user signal that are potentially indicative of electrical activity detected in response to a particular audio output of one of the options that are presented in response to a trigger. For example, each segment may begin at or near a point in time when the audible presentation is presented to the user and/or when different portions (e.g., different words, phrases, etc.) of the audible output are presented to the user. Likewise, each segment may terminate or end at or near a conclusion of the presentation of the audible output to the user and/or at the conclusion of the audible presentation of different portions of the audible output. In still other examples, the user signal may be processed, for example, as the user signal is received, to detect changes in the user signal that satisfy a threshold and segments of the user signal initiated and/or terminated at or near those detected changes. The electrical activity may be electrical activity of a brain of the user, electrical activity indicative of eye movement of the user, electrical activity of muscle movement of the user, or any combination thereof.

Each segment of the user signal may then be combined to generate a combined user signal, as in 502. For example, each determined segment of the user signal may be averaged or otherwise combined to generate a combined user signal.

The example process may then select one of the options that was audibly output to the user as part of the audible presentation generated in response to the detection of a trigger (or a standard option), as in 504. For example, the option that was audibly output just prior to each of the determined segments of the user signal may be selected.

A determination may also be made as to whether other inputs are to be considered as part of the example process 500, as in 506. For example, in some implementations, the user may include or provide other inputs such as, particular eye movements, muscle activity, gestures, etc. If other inputs are to be considered, the other inputs are included, as in 508.

After including other inputs at block 508, or if it is determined at decision block 506 that other inputs are not to be considered, an option probability score for the selected option is determined based on a similarity between the stored audible output of the option and the combined user signal, and optionally the other inputs, as in 510. For example, a DNN, such as a convolutional neural network, may be trained to compare a combined user signal with the stored audio signal of the selected option to determine the probability score. In other examples, one or more of a linear classification model, stimulus reconstruction model, canonical correlation analysis, etc., may be utilized to determine probability scores.

A determination may then be made as to whether a next presented option is to be selected and processed using the example process 500, as in 512. If it is determined that a next presented option is to be selected and processed, the example process 500 returns to block 504 and continues. If it is determined at decision block 512 that a next presented option is not to be selected and processed, the determined option probability score for each option is returned, as in 514, and example process 500 completes.

Figure 6:
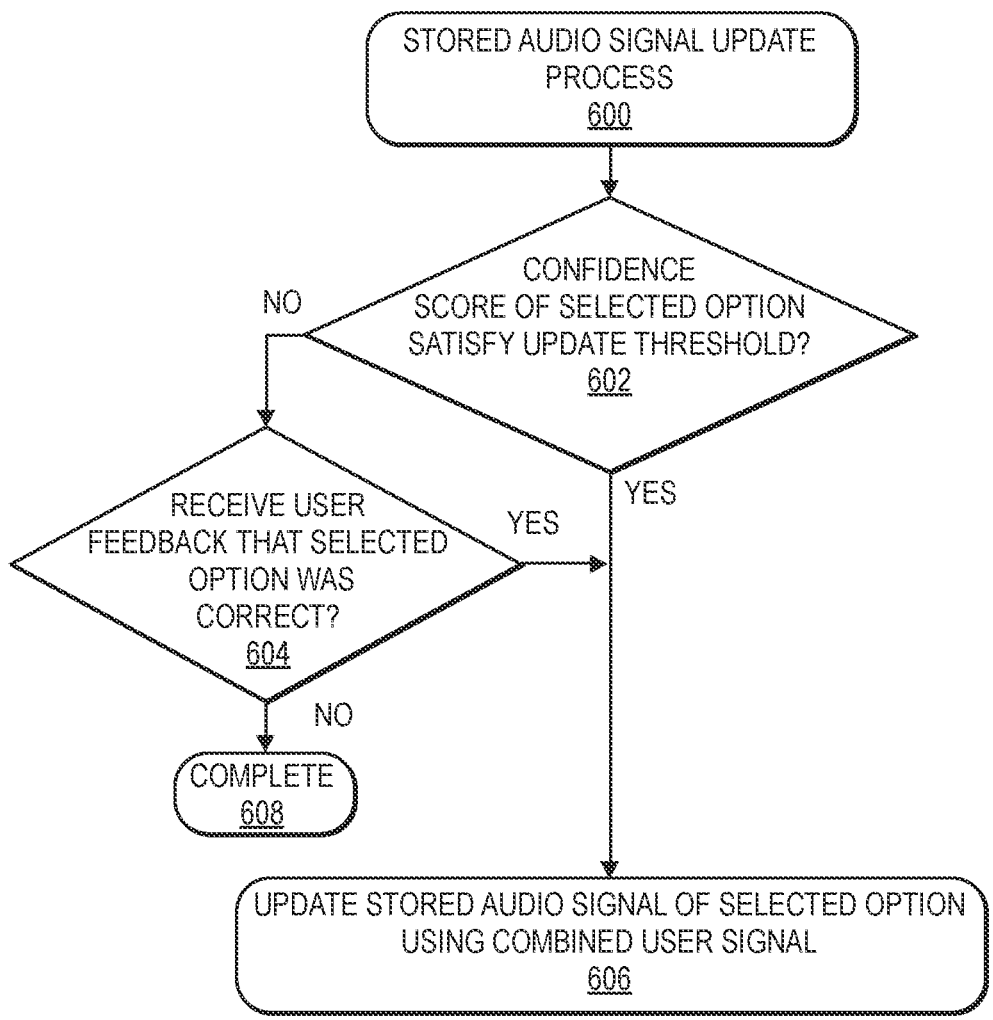
FIG. 6 is an example stored audio signal update process, in accordance with implementations of the present disclosure.

FIG. 6 is an example stored audio signal update process 600, in accordance with implementations of the present disclosure. In some implementations, the stored audio signal for one or more options may be periodically updated to further refine the stored audio signal to correspond to the electrical signals detected in response to audible presentation of options to a user in response to a detected trigger.

The example process 600 begins by determining whether an option that was selected as responsive to a detected trigger was determined with a confidence score that satisfies an update threshold, as in 602. As discussed above, as part of determining upon which option the user was focusing their attention, a confidence score is determined that indicates a confidence that the option is being properly selected. If it is determined that the confidence score for the selected option does not satisfy the update threshold, a determination may be made as to whether user feedback was received indicating that the selected option was the correct option, as in 604. For example, a user may provide a positive feedback or other confirmation to indicate that the option selected based on the combined user signal detected in response to an audible presentation was correct. If it is determined that a feedback that the selected option was correct was not received, the example process 600 completes, as in 608, and does not update the stored audio signal for the option.

If it is determined that the user did provide a positive feedback that the selected option was correct, or if it is determined at decision block 602 that the selected option was determined with a high confidence score that satisfies the update threshold, the stored audio signal of the option may be updated using the combined user signal that was received in response to the audible presentation of the option, as in 606. For example, the stored audio signal and the combined user signal may be averaged or otherwise combined to update the stored audio signal for the option. In some examples, older user signals that were used to update the stored audio signals may be assigned a lower weight than newer user signals and/or a decay function may be utilized so that newer user signals that are used to update the stored audio signal may have a larger impact. Periodically updating stored audio signals of options based on specific combined user signals that are received in response to audible presentation of those options, further refines the stored audio signals to be specific to the user, thereby increasing the likelihood of correctly determining the option upon which the user is focusing their attention.

Figure 7:
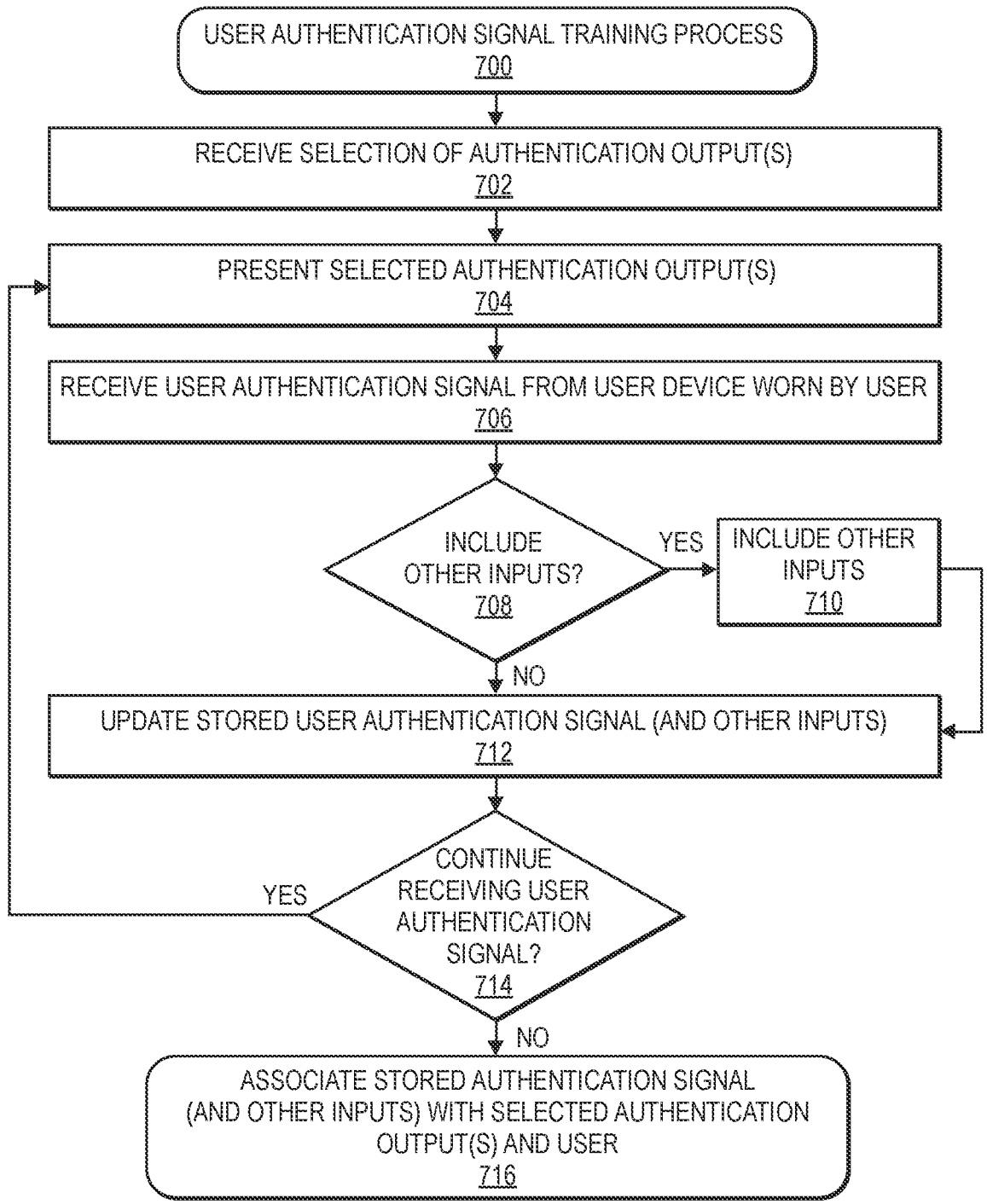
FIG. 7 is an example user authentication signal training process, in accordance with implementations of the present disclosure.

FIG. 7 is an example user authentication signal training process 700, in accordance with implementations of the present disclosure.

The example process 700 begins by receiving a selection of one or more authentication outputs, as in 702. Similar to options discussed above, authentication outputs may include one or more of a word, a plurality of words, a phrase, a sentence, an audible tone, a series of audible tones, etc. Authentication outputs may be any output that can be audibly presented to a user and upon which the user may focus their brain (aka focus their attention). In other implementations, the authentication output need not be auditorily presented and may instead be visually and/or haptically presented. For example, the authentication output may be a visual presentation that is output to the user. In another example, the authentication output may be a haptic output that is physically presented to the user.

In comparison to options, authentication outputs, when presented to the user and when the user focuses their attention on a particular authentication output, rather than the user signal that is received and used to select an option that results in performance of one or more actions, the user signal (authentication signal) is used to uniquely identify or authenticate the user. In particular, electrical signals detected from the brain in response to an input are unique and different for each individual. As such, regardless of the authentication output or who it is presented to, the user signal that is detected from the electrical activity of the brain of the user in response to that authentication output will be different for each user. Accordingly, user authentication signals may be used to reliably authenticate or uniquely identify a user and are difficult, if not impossible to duplicate.

Returning to FIG. 7, the selected authentication output(s) may be presented to a user (e.g., visibly presented, audibly presented, and/or haptically presented), as in 704, and the user authentication signal received from a user device worn by or otherwise coupled to the user in response to the presentation of the selected authentication output(s), as in 706. As discussed above, the authentication output may be presented by the user device and/or by another device, such as a speech-controlled device.

In some implementations, a determination may also be made, as to whether other inputs are to be considered in processing a user authentication signal that has been received, as in 708. Other inputs may include, but are not limited to, physical motion-based inputs of the user, verbal inputs of the user, mental inputs of the user, etc. For example, a defined user authentication may include electrical activity resulting from the brain of the user in response to receiving an authentication output along with the other input of the user clicking their tongue. If it is determined that other inputs are to be included, the other inputs are added to the received user authentication signal, as in 710. After including the other inputs at block 710, or if it is determined that other inputs are not to be included at decision block 708, the user authentication signal and optionally other inputs are stored in a memory of the user device, as in 712. If the example process 700 has been performed multiple times for training a user authentication signal, the stored user authentication signal may be updated with the additional receipt of each user authentication signal. As will be appreciated, the user authentication signal received from the wearable device worn by or otherwise coupled to the user may be received multiple times as part of the example training process 700.

With each receipt of the user authentication signal, the stored user authentication signal may be updated to produce a combined user authentication signal.

A determination may then be made as to whether the user authentication signal is to continue to be received as part of the example process 700, as in 714. If it is determined that the user authentication signal is to be again received as part of the training process, the example process 700 returns to block 704 and continues. In some implementations, the example process 700 may be performed a defined number of times such that the user authentication signal is received from the wearable device multiple times. Each receipt of the user authentication signal may then be combined to create a stored user authentication signal. In other implementations, each time the user authentication signal is received, it may be compared to the stored user authentication signal to determine differences between the two signals. If the difference satisfies a threshold, the received user authentication signal may be combined with the stored user authentication signal to update the stored user authentication signal. In comparison, if the difference does not satisfy the threshold, it may be determined that the stored user authentication signal has been updated a sufficient number of times to ensure accurate detection.

If it is determined that the user authentication signal is not to be again received at decision block 714, the stored user authentication signal, and optionally other inputs, are associated with the provided authentication outputs and the user, as in 716.

While the example 700 discussed about with respect to FIG. 7 describes a user authentication signal being trained and received in response to an authentication output, in other implementations, the user authentication signal may be monitored for and detected without the need for audible presentation of one or more authentication outputs. For example, the user authentication signal may be representative of electrical activity generated by the brain in response to the user performing a mental mathematical calculation. In such an example, the user may generate the user authentication signal without the need for an audible presentation of an authentication output. As such, in some implementations, the example process 700 may be performed without the need for selection of an authentication output at block 702 or the audible presentation of the selected authentication output(s) at block 704.

Figure 8A:
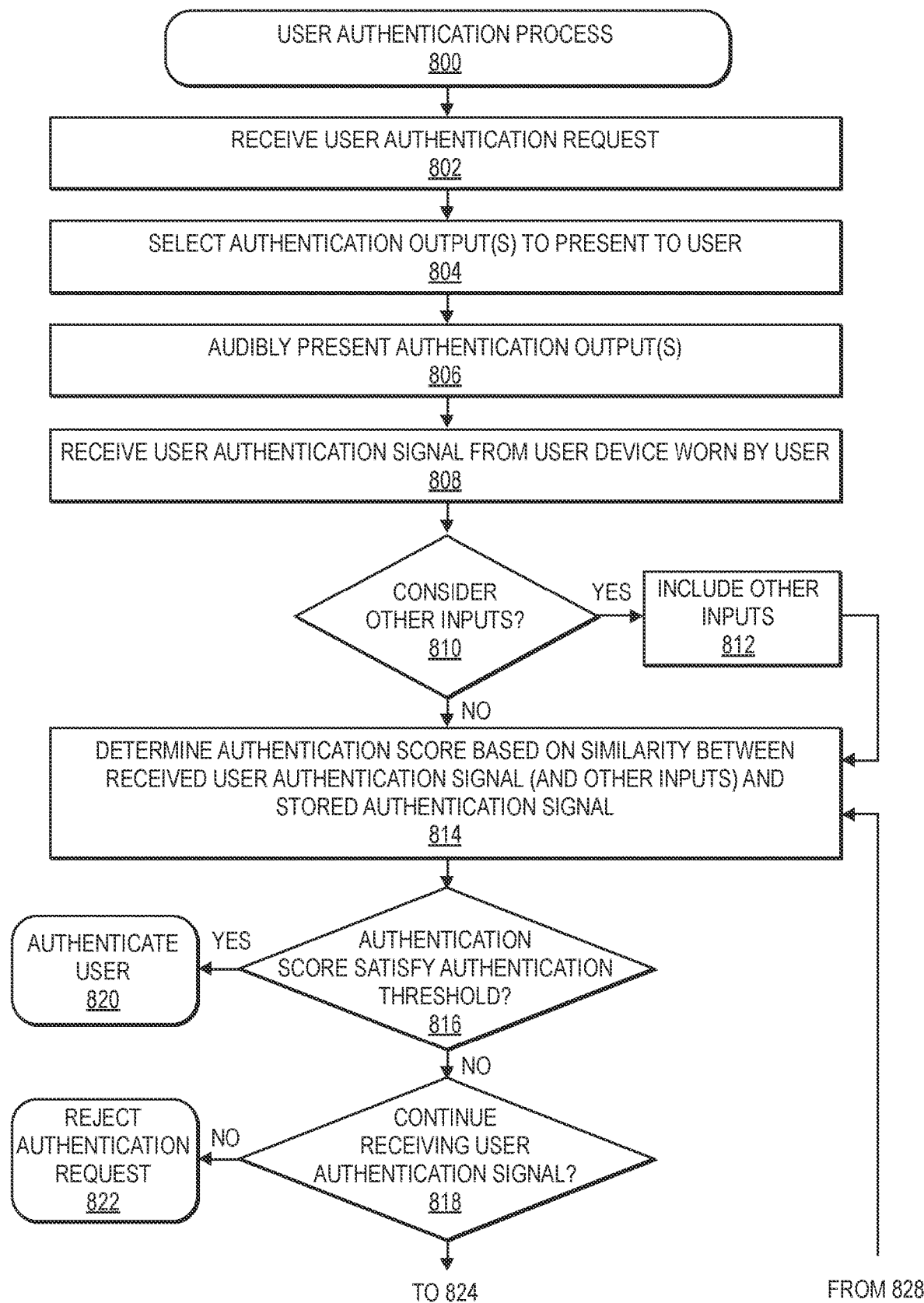
FIGS. 8A and 8B are an example user authentication process, in accordance with implementations of the present disclosure.
Figure 8B:
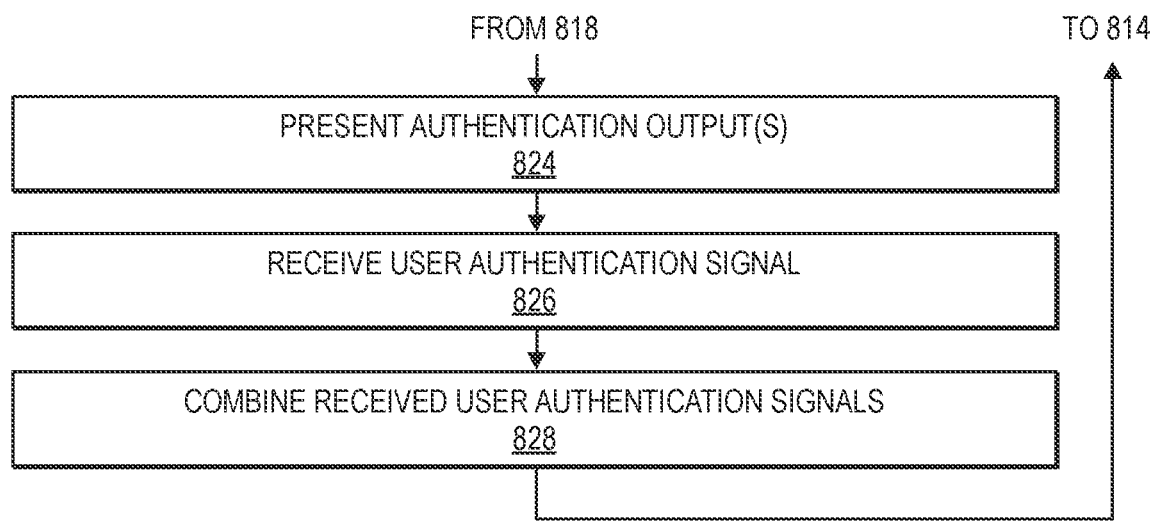

FIGS. 8A and 8B are an example user authentication process 800, in accordance with implementations of the present disclosure.

The example process 800 begins upon receipt of a user authentication request, as in 802. User authentication requests may come from the user, an application executing on a portable device of the user, upon request from a remote application requesting authentication of the user, or from any other channel or source. As another example, an authentication request may occur when a user is attempting to access restricted content, such as a private account (e.g., electronic banking information) of the user, etc. As still another example, an authentication request may occur when the user interacts with another device, such as a speech-controlled device, a portable device, etc. For example, the authentication request may be part of an interaction between the user and a speech-controlled device when the user is requesting that the device begin playing music, or to order a product. Such a request may be considered a user authentication request.

Upon receipt of a user authentication request, one or more authentication outputs associated with the user may be selected, as in 804, and audibly presented to the user, as in 806. For example, as discussed above, a user authentication output may be audibly presented to the user in a particular spatial direction, with other audible outputs, etc. For example, an authentication output may be audibly presented to a user concurrently with multiple other audible outputs, thereby further increasing the security of the authentication process. In particular, the user may be the only individual that knows which of the audible presentations is the authentication output associated with the user and the one upon which the user is to focus their attention.

In response to audibly presenting one or more authentication outputs, the example process 800 receives a user authentication signal from the user device worn by or otherwise coupled to the user, as in 808. Similar to user signals, the user authentication signal may include electrical signals received from a sensor of the user device worn by or otherwise coupled to the user that is indicative of electrical activity generated by the body, such as the brain, the eye, muscle movement, etc., in response to the received audible presentation of the one or more authentication outputs.

In some implementations, a determination may also be made as to whether other inputs are to be considered in authenticating the user, as in 810. Other inputs may include, but are not limited to, physical motion-based inputs of the user, verbal inputs of the user, mental inputs of the user, etc. For example, a defined user authentication signal may include electrical activity resulting from the brain of the user in response to receiving an authentication output along with the other input of the user clicking their tongue. If it is determined that other inputs are to be included, the other inputs are added to the received user authentication signal, as in 812. After including the other inputs at block 812, or if it is determined that other inputs are not to be included at decision block 810, the user authentication signal and optionally other inputs are compared with the stored user authentication signal and optionally other inputs that were generated during training of the stored user authentication signal (FIG. 7) to determine an authentication score, as in 814.

A determination may then be made as to whether the authentication score satisfies an authentication threshold, as in 816. The authentication threshold may be any value or level that must be satisfied to authenticate the user and may vary for different users, for different authentications, etc. If it is determined that the authentication score satisfies the authentication threshold, the user is authenticated, as in 820.

If it is determined that the authentication score does not satisfy the authentication threshold, a determination may be made as to whether the example process 800 is to continue receiving the authentication signal, as in 818. For example, the user authentication signal may be received for a defined period of time and each instance of the detected authentication signal may be combined to generate a combined user authentication signal that may then be compared to the stored authentication signal. If it is determined that the user authentication signal is not to be further received, the authentication request is rejected and the user is not authenticated, as in 822.

If it is determined that the user authentication signal is to continue to be received, and turning now to FIG. 8B, the example process 800 may continue to present the one or more authentication outputs, as in 824, and the additional user authentication signals received, as in 826. As the user authentication signal(s) are received, the user authentication signals may be combined to generate a combined user authentication signal, as in 828. The example process 800 may then return to block 814 and continue with use of the combined user authentication signal to determine if the user can be authenticated by the example process 800.

FIG. 9 is a block diagram illustrating components of an example user device 987, in accordance with implementations of the present disclosure.

In the illustrated implementation, the user device 987 includes one or more processors 910, coupled to a non-transitory computer-readable storage medium or memory 920 via an input/output (I/O) interface 930. The user device 987 further includes a wired/wireless transmitter 950 that enables wired/wireless communication between the user device 987 and other devices, networks, etc., such as a portable device and/or remote computing resources. The wired/wireless transmitter 950 may utilize any form of wired and/or wireless communication including, but not limited to USB audio, compressed audio, Bluetooth, Near Field Communication, Wi-Fi, cellular, etc.

In various implementations, the user device 987 may be a uniprocessor system including one processor 910, or a multiprocessor system including several processors (e.g., two, four, eight, or another suitable number). The processor(s) 910 may be any suitable processor capable of executing instructions. For example, in various implementations, the processor(s) 910 may be general-purpose or embedded processors implementing any of a variety of instruction set architectures (ISAs), such as the x86, PowerPC, SPARC, or MIPS ISAs, or any other suitable ISA. In multiprocessor systems, each of the processors 910 may commonly, but not necessarily, implement the same ISA.

The non-transitory computer-readable storage medium 920 may be configured to store executable instructions and/or data accessible by the one or more processors 910. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 922, triggers 924, authentications 927, and presentation options 928. In other implementations, program instructions and/or data may be received, sent or stored upon different types of computer-accessible media, such as non-transitory media, or on similar media separate from the non-transitory computer-readable storage medium 920 or the user device 987. Generally speaking, a non-transitory, computer-readable storage medium may include storage media or memory media such as magnetic or optical media, e.g., disk or CD/DVD-ROM, coupled to the user device 987 via the wired/wireless transmitter 950. Program instructions and data stored via a non-transitory computer-readable medium may be transmitted by transmission media or signals such as electrical, electromagnetic, or digital signals, which may be conveyed via a communication medium such as a wireless link, such as may be implemented via the wired/wireless transmitter 950.

As discussed above, the user device 987 also includes one or more speakers 913-1, often in the form of speaker arrays, and may optionally include one or more microphones 913-2, which are collectively identified in FIG. 9 as transducers 913. As discussed above, the speakers 913-1 of one or more speaker arrays of the user device 987 may be used to output sounds that are perceived by a listener wearing the user device as having a perceived point source originating from any direction with respect to the listener. The microphones 913-2 may be used to receive audio generated by the listener/user wearing the user device 987 and/or to receive audio data output by the speakers 913-1. In some implementations, the user device 987 may also include an auditory processing component 935 that is operable to perform some or all of the implementations discussed herein. In addition, the user device 987 may include one or more biologic sensors (e.g., electrodes-wet electrodes, dry electrodes, etc.), such as an EEG, EOG, and/or EMG sensor(s) that, when the user device 987 is worn by or otherwise coupled to a body, the biologic sensor(s) 936 are able to detect and record electrical activity generated by the body, such as in response to an audible presentation.

Likewise, the user device 987 may also include one or more power sources 911, such as batteries, and one or more imaging elements 960, such as one or more two-dimensional cameras. In some implementations, the batteries may be rechargeable and incorporated into the user device 987 and operable to provide power to the transducers 913, the wired/wireless transmitter 950 of the user device 987, etc. In other implementations, the user device may be passive and receive power through a wired and/or wireless connection, such as through the wired/wireless transmitter 950.

The I/O interface 930 may be configured to coordinate I/O traffic between the processor(s) 910, biologic sensors 936, the non-transitory computer-readable storage medium 920, and any peripheral devices, including the wired/wireless transmitter 950 or other peripheral interfaces. In some implementations, the I/O interface 930 may perform any necessary protocol, timing or other data transformations to convert data signals from one component (e.g., non-transitory computer-readable storage medium 920) into a format suitable for use by another component (e.g., processors 910). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processor(s).

The wired/wireless transmitter 950 may be configured to allow data to be exchanged between the user device 987 and other devices attached to a network and/or the user device, such as a portable device, and/or one or more remote computing systems.

As shown in FIG. 9, the memory 920 may include program instructions 922 that may be configured to implement one or more of the described implementations and/or provide data storage for triggers 924, authentications 927, presentation options 928, etc.

Those skilled in the art will appreciate that the user device 987 is merely illustrative and is not intended to limit the scope of implementations. In particular, the user device may include any combination of hardware or software that can perform the indicated functions. The user device 987 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 10:
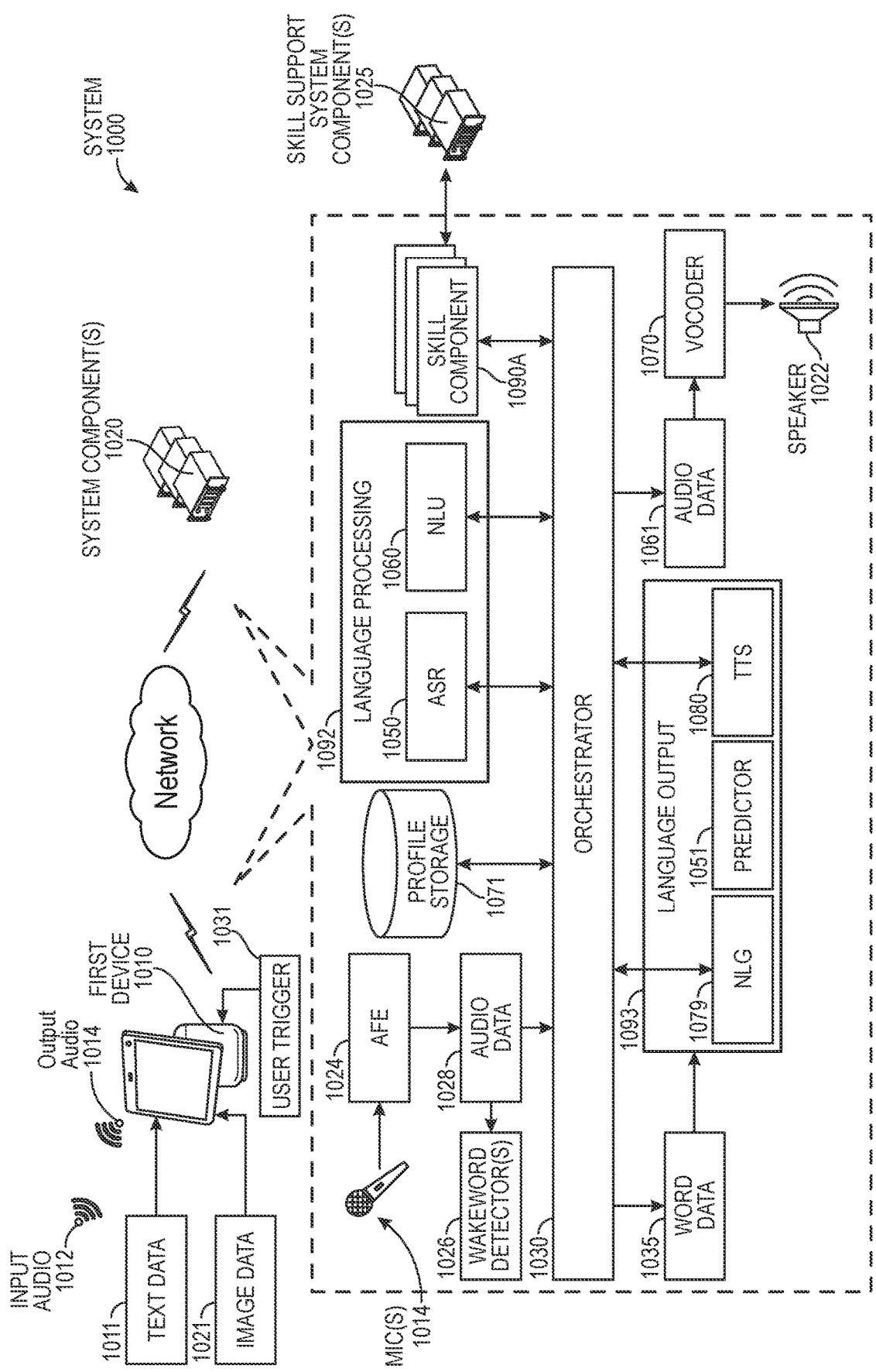
FIG. 10 is a conceptual diagram illustrating example components of a speech processing system, in accordance with implementations of the present disclosure.

FIG. 10 is a conceptual diagram illustrating example components of a speech processing system 1000, according to implementations of the present disclosure. In some implementations, other speech processing components may be integrated with the system 1000 for synthesizing speech. The speech processing components may include components and/or features for processing natural language, including processing related to ASR, NLU, NLG, and/or TTS. The system may include a predictor 1050 that operates with the TTS component 1080 to generate synthesized speech that sounds more natural to a human listener and/or may be more appropriate for a given context.

The various components of the example system 1000 may be located on the same or different physical devices; for example, the first device 1010, which may be a user device as discussed above, another device (e.g., portable phone, etc.), one or more system component(s) 1020, and/or one or more skill support system component(s) 1025. Various components of the system 1000 may be divided or duplicated between the first device 1010 and the one or more system components 1020.

Returning to FIG. 10, the device 1010 may include audio capture component(s), such as a microphone or array of microphones of a device 1010, captures audio 1012 and creates corresponding audio data 1028. An acoustic front end (AFE) 1024 may process the audio signal using a number of techniques, such as determining frequency-domain audio data by using a transform such as a fast Fourier transform (FFT) and/or determining a Mel-cepstrum. The AFE 1024 may output audio data 1028, which may be or include acoustic feature data corresponding to a representation of the input audio 1012. The AFE 1024 may process the audio signal to create acoustic feature data, which may include one or more acoustic-feature vectors such as logarithm of filter bank energy (LFBE) vectors. Other types of feature vectors may be similarly created and used; for example, the feature vectors may include Mel-frequency cepstrum coefficients (MFCCs).

The AFE 1024 may include an analysis filterbank that processes one or more frames of audio data (and/or other sequential input data). The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

Once speech is detected in audio data 1028 representing the audio 1012, the device 1010 may determine if the speech is directed at the device 1010/system component 1020. In at least some implementations, such determination may be made using a wakeword detection component 1026. The wakeword detection component 1026 may be configured to detect various wakewords. In at least some examples, each wakeword may correspond to a name of a different digital assistant. An example wakeword/digital assistant name is "Alexa." In other examples, input to the system may be a user trigger 1031, as discussed above, that is received from a user device worn by or otherwise coupled to a user and based on electrical activity collected from the user. In still another example, input to the system may be in form of text data 1011, for example as a result of a user typing an input into a user interface of the device 1010. Other input forms may include indication that the user has pressed a physical or virtual button on the device 1010, the user has made a gesture, etc. The device 1010 may also capture images using camera(s) 1118 of the device 1010 and may generate image data 1021 representing those image(s). The image data 1021 may include raw image data or image data processed by the device 1010 and/or the system component 1020. The image data 1021 may be used in various manners by different components of the system 1000 to perform operations such as determining whether a user is directing an utterance to the system, interpreting a user command, responding to a user command, etc.

The wakeword detection component 1026 of the device 1010 may process the audio data, representing the audio 1012, to determine whether speech is represented therein. The device 1010 may use various techniques to determine whether the audio data includes speech. In some examples, the device 1010 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 1010 may implement a classifier configured to distinguish speech from background noise. The classifier may be implemented by techniques such as linear classifiers, support vector machines, and decision trees. In still other examples, the device 1010 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the input audio 1012, is analyzed to determine if specific characteristics of the audio data match preconfigured acoustic waveforms, audio signatures, or other data corresponding to a wakeword.

Thus, the wakeword detection component 1026 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1026 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1026 and/or input is detected by an input detector, the device 1010 may "wake" and begin generating audio data 1028 representing the input audio 1012. The audio data 1028 may include data corresponding to the wakeword; in other implementations, the portion of the audio corresponding to the wakeword is removed by the device 1010 prior to sending the audio data 1028 to downstream components of the system 1000. In the case of touch input detection or gesture based input detection, the audio data may not include a wakeword.

In some implementations, the system 1000 may include more than one system component 1020. The system components 1020 may respond to different wakewords and/or perform different categories of tasks. Each system component 1020 may be associated with its own wakeword such that speaking a certain wakeword results in audio data being sent to and processed by a particular system. For example, detection of the wakeword "Alexa" by the wakeword detection component 1026 may result in sending audio data to a first system component 1020 for processing while detection of the wakeword "Computer" by the wakeword detector may result in sending audio data to a second system for processing. The system may have a separate wakeword and system for different skills/systems (e.g., "Dungeon Master" for a game play skill/system component 1020) and/or such skills/systems may be coordinated by one or more skill component(s) 1090 of one or more system components 1020.

Upon receipt by the system 1000, the audio data 1028 may be sent to an orchestrator component 1030. The orchestrator component 1030 may include memory and logic that enables the orchestrator component 1030 to transmit various pieces and forms of data to various components of the system, as well as perform other operations as described herein.

The orchestrator component 1030 may send the audio data 1028 to language processing components 1092. The language processing components 1092 (sometimes also referred to as a spoken language understanding (SLU) components) includes an automatic speech recognition (ASR) component 1050 and a natural language understanding (NLU) component 1060. The ASR component 1050 may transcribe the audio data 1028 into ASR data (e.g., text data). The text data output by the ASR component 1050 represents one or more than one (e.g., in the form of an N-best list) ASR hypotheses representing speech represented in the audio data 1028. The ASR component 1050 interprets the speech in the audio data 1028 based on a similarity between the audio data 1028 and pre-established language models. For example, the ASR component 1050 may compare the audio data 1028 with models for sounds (e.g., acoustic units such as phonemes, senones, phones, etc.) and sequences of sounds to identify words that match the sequence of sounds of the speech represented in the audio data 1028. The ASR component 1050 sends the text data generated thereby to an NLU component 1060, via, in some implementations, the orchestrator component 1030. The text data sent from the ASR component 1050 to the NLU component 1060 may include a single top-scoring ASR hypothesis or may include an N-best list including multiple top-scoring ASR hypotheses. An N-best list may additionally include a respective score associated with each ASR hypothesis represented therein. The ASR component 1050 is described in greater detail below with regard to FIG. 11.

The language processing components 1092 may further include a NLU component 1060. The NLU component 1060 may receive the text data from the ASR component 1050. The NLU component 1060 may attempt to make a semantic interpretation of the phrase(s) or statement(s) represented in the text data input therein by determining one or more meanings associated with the phrase(s) or statement(s) represented in the text data. The NLU component 1060 may determine an intent representing an action that a user desires be performed and may determine information that allows a device (e.g., the device 1010, the system component(s) 1020, a skill component 1090, skill support system component(s) 1025, etc.) to execute the intent. For example, if the text data corresponds to "play the 5th Symphony by Beethoven," the NLU component 1060 may determine an intent that the system output music and may identify "Beethoven" as an artist/composer and "5th Symphony" as the piece of music to be played. For further example, if the text data corresponds to "what is the weather," the NLU component 1060 may determine an intent that the system output weather information associated with a geographic location of the device 1010. In another example, if the text data corresponds to "turn off the lights," the NLU component 1060 may determine an intent that the system turn off lights associated with the device 1010 or the user. However, if the NLU component 1060 is unable to resolve the entity—for example, because the entity is referred to by anaphora such as "this song" or "my next appointment"—the language processing components 1092 can send a decode request to other language processing components 1092 for information regarding the entity mention and/or other context related to the utterance. The language processing components 1092 may augment, correct, or base results data upon the audio data 1028 as well as any data received from the other language processing components 1092.

The NLU component 1060 may return NLU results data 1385/1325 (which may include tagged text data, indicators of intent, etc.) back to the orchestrator component 1030. The orchestrator component 1030 may forward the NLU results data to a skill component(s) 1090. If the NLU results data includes a single NLU hypothesis, the NLU component 1060 and the orchestrator component 1030 may direct the NLU results data to the skill component(s) 1090 associated with the NLU hypothesis. If the NLU results data 1385/1325 includes an N-best list of NLU hypotheses, the NLU component 1060 and the orchestrator component 1030 may direct the top scoring NLU hypothesis to a skill component(s) 1090 associated with the top scoring NLU hypothesis. The system 1000 may also include a post-NLU ranker 1395 which may incorporate other information to rank potential interpretations determined by the NLU component 1060. The NLU component 1060, post-NLU ranker 1395 and other components are described in greater detail below with regard to FIGS. 12 and 13.

A skill component may be software running on the device 1010 and/or system component(s) 1020 that is akin to a software application. That is, a skill component 1090 may enable the device 1010 and/or system component(s) 1020 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The device 1010 and/or system component(s) 1020 may be configured with more than one skill component 1090. For example, a weather service skill component may enable the device 1010 and/or system component(s) 1020 to provide weather information, a car service skill component may enable the device 1010 and/or system component(s) 1020 to book a trip with respect to a taxi or ride sharing service, a restaurant skill component may enable the device 1010 and/or system component(s) 1020 to order a pizza with respect to the restaurant's online ordering system, etc. A skill component 1090 may operate in conjunction with the device 1010 and/or system component(s) 1020 in order to complete certain functions. Inputs to a skill component 1090 may come from speech processing interactions, actions determined from user signals generated from electrical activity of the body of the user, or through other interactions or input sources. A skill component 1090 may include hardware, software, firmware, or the like that may be dedicated to a particular skill component 1090 or shared among different skill components 1090.

Skill support system component(s) 1025 may communicate with a skill component(s) 1090 within the device 1010 and/or system component(s) 1020 and/or directly with the orchestrator component 1030 or with other components. Skill support system component(s) 1025 may be configured to perform one or more actions. An ability to perform such action(s) may sometimes be referred to as a "skill." That is, a skill may enable skill support system component(s) 1025 to execute specific functionality in order to provide data or perform some other action requested by a user. For example, a weather service skill may enable skill support system component(s) 1025 to provide weather information to the device 1010 and/or system component(s) 1020, a car service skill may enable skill support system component(s) 1025 to book a trip with respect to a taxi or ride sharing service, an order pizza skill may enable skill support system component(s) 1025 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The device 1010 and/or system component(s) 1020 may be configured with a skill component 1090 dedicated to interacting with the skill support system component(s) 1025. Unless expressly stated otherwise, reference to a skill, skill device, or skill component may include a skill component 1090 operated by the device 1010 and/or system component(s) 1020 and/or skill operated by the skill support system component(s) 1025. Moreover, the functionality described herein as a skill or skill component may be referred to using many different terms, such as an action, bot, app, or the like. The skill component 1090 and or skill support system component(s) 1025 may return output data to the orchestrator component 1030.

The system 1000 may include language output components 1093. The language output components 1093 may include a natural language generation (NLG) component 1079 and a text-to-speech (TTS) component 1080. The NLG component 1079 can generate text for purposes of TTS output to a user. For example, the NLG component 1079 may generate text corresponding to instructions corresponding to a particular action for the user to perform. The NLG component 1079 may generate appropriate text for various outputs as described herein. The NLG component 1079 may include one or more trained models configured to output text appropriate for a particular input. The text output by the NLG component 1079 may become input for the TTS component 1080 (e.g., output word data 1035 discussed below). Alternatively, or in addition, the TTS component 1080 may receive text data from a skill component 1090 or other system component for output.

The NLG component 1079 may include a trained model. The NLG component 1079 generates word data 1035 from dialog data received by, for example, a dialog manager such that the output word data 1035 has a natural feel and, in some implementations, includes words and/or phrases specifically formatted for a requesting individual. The NLG may use templates to formulate responses. And/or the NLG component may include models trained from the various templates for forming the output word data 1035. For example, the NLG component may analyze transcripts of local news programs, television shows, sporting events, or any other media program to obtain common components of a relevant language and/or region. As one illustrative example, the NLG component 1079 may analyze a transcription of a regional sports program to determine commonly used words or phrases for describing scores or other sporting news for a particular region. The NLG component 1079 may further receive, as inputs, a dialog history, an indicator of a level of formality, and/or a command history or other user history such as the dialog history.

The NLG component 1079 may generate dialog data based on one or more response templates. Further continuing the example above, the NLG component 1079 may select a template in response to the question, "What is the weather currently like?" of the form: "The weather currently is $weather_information$." The NLG component 1079 may analyze the logical form of the template to produce one or more textual responses including markups and annotations to familiarize the response that is generated. In some implementations, the NLG component 1079 may determine which response is the most appropriate response to be selected. The selection may, therefore, be based on past responses, past questions, a level of formality, and/or any other feature, or any other combination thereof. Responsive audio data representing the response generated by the NLG component 1079 may then be generated using the TTS component 1080.

The TTS component 1080 may generate audio data (e.g., synthesized speech) from word data and/or text data, which may represent natural language content, using one or more different methods. Word data 1035 input to the TTS component 1080 may come from a skill component 1090, the orchestrator component 1030, or another component of the system. The TTS component 1080 may generate synthesized speech by various methods. In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to create audio data including an artificial speech waveform. The TTS component 1080, including unit-based and model-based TTS operation, is described in additional detail below with reference to FIG. 14.

The system 1000 may include computerized voice generator, sometimes called a vocoder 1470, for converting the predicted data to an audio signal suitable for amplification and output from, for example, a loudspeaker 1022.

The system 1000 (either on device 1010, system component 1020, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information; user triggers, action triggers, and/or event triggers; stored audio signals of options; user authentication signals; as well as other information.

The profile storage 1071 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into an application installed on a device 1010, the user profile (associated with the presented login information) may be updated to include information about the device 1010, for example with an indication that the device is currently in use. Each user profile may include identifiers of skills that the user has enabled. When a user enables a skill, the user is providing the device 1010 and/or system component 1020 with permission to allow the skill to execute with respect to the user's natural language user inputs and/or with respect to user signals received from a user device worn or otherwise attached to the user. If a user does not enable a skill, the device 1010 and/or system component 1020 may not invoke the skill to execute with respect to the user's natural language user inputs.

The profile storage 1071 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1071 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 11:
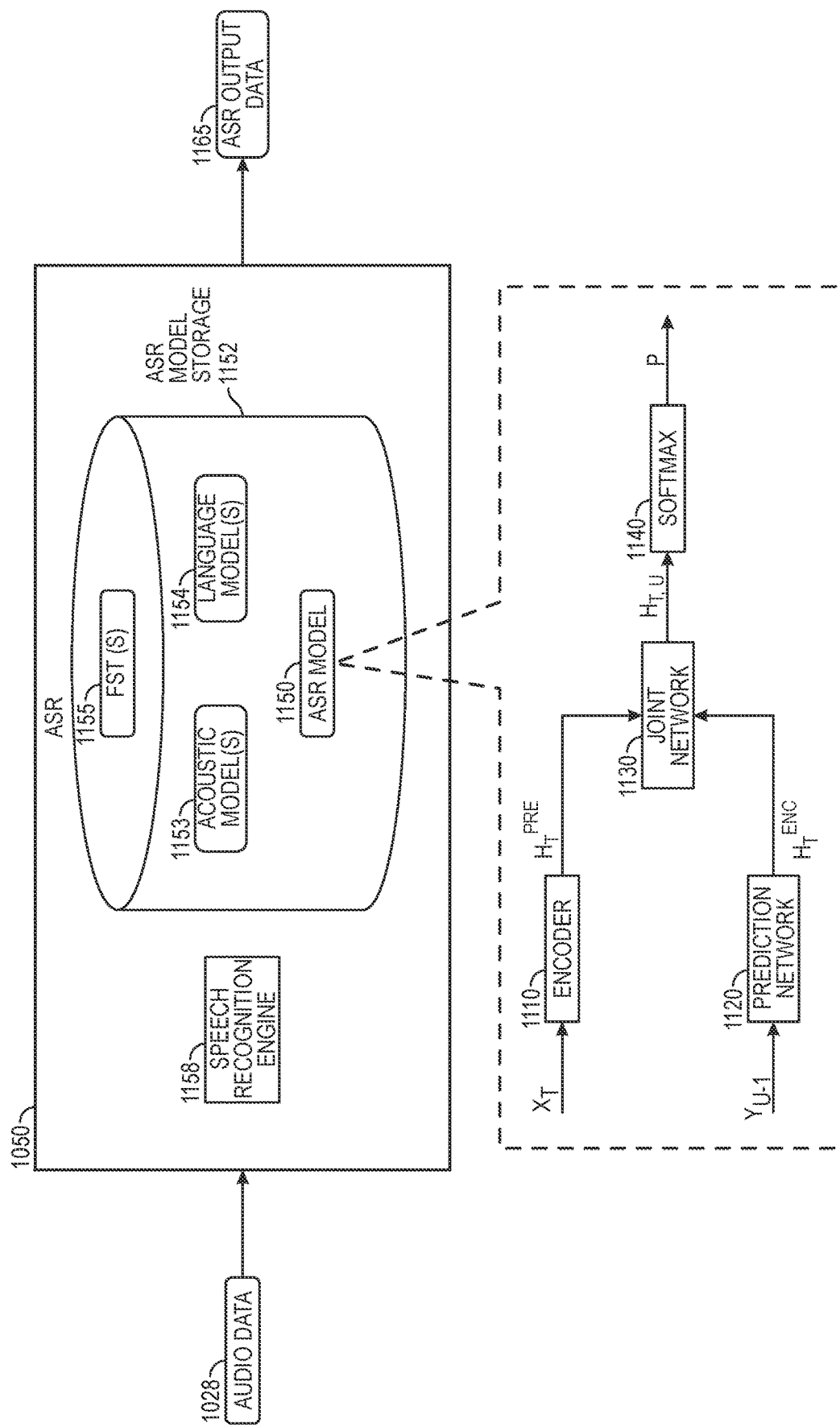
FIG. 11 is a conceptual diagram of an automatic speech recognition component, in accordance with implementations of the present disclosure.

FIG. 11 is a conceptual diagram of an ASR component 1050, according to implementations of the present disclosure. The ASR component 1050 may receive audio data 1028 and process it to recognize and transcribe speech contained therein. The ASR component 1050 may output the transcript as ASR output data 1165. In some cases, the ASR component 1050 may generate more than one ASR hypothesis (e.g., representing a possible transcript) for a single spoken natural language input. An ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, a similarity of the sound in the spoken natural language input to models for language sounds (e.g., an acoustic model 1153 stored in the ASR model storage 1152), and the likelihood that a particular word, which matches the sounds, would be included in the sentence at the specific location (e.g., using a language model 1154). Based on the considered factors and the assigned confidence score, the ASR component 1050 may output an ASR hypothesis that most likely matches the spoken natural language input, or may output multiple ASR hypotheses in the form of a lattice or an N-best list, with each ASR hypothesis corresponding to a respective score.

The ASR component 1050 may interpret a spoken natural language input using one or more models in the ASR model storage 1152. Such models may consist of NN-based end-to-end models such as the ASR model 1150 previously described. Some models may process the audio data 1028 based on the similarity between the spoken natural language input and acoustic units (e.g., representing subword units or phonemes) in an acoustic model 1153, and use a language models 1154 to predict words/phrases/sentences likely represented by sequences of the acoustic units. In some implementations, a finite state transducer (FST) 1155 may perform language model functions.

The ASR component 1050 may include a speech recognition engine 1158. The ASR component 1050 may receive audio data 1028 from, for example, a microphone 1014 of a device 1010. In some cases, the audio data 1028 may have been processed audio detected by an AFE 1024 or other component. The speech recognition engine 1158 may process the audio data 1028 using one or more of the ASR model 1150, acoustic models 1153, language models 1154, FST(s) 1155, and/or other data models and information for recognizing the speech conveyed in the audio data. The audio data 1028 may be audio data that has been digitized (for example by the AFE 1024) into frames representing time intervals for which the AFE 1024 determines a number of values, called features, representing the qualities of the audio data, along with a set of those values, called a feature vector, representing the features/qualities of the audio data within the frame. In at least some implementations, audio frames may be 10 ms each. In some implementations, an audio frame may represent a larger window of audio; for example, ~2 ms. Many different features may be determined, as known in the art, and each feature may represent some quality of the audio that may be useful for ASR processing. A number of approaches may be used by an AFE to process the audio data, such as log-filterbank energies (LFBE), Mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data 1028 may arrive at the system component 1020 encoded, in which case they may be decoded by the speech recognition engine 1158 and/or prior to processing by the speech recognition engine 1158.

In some implementations, the ASR component 1050 may process the audio data 1028 using the ASR model 1150. The ASR model 1150 may be, for example, a recurrent neural network such as an RNN-T. An example RNN-T architecture is illustrated in FIG. 11. The ASR model 1150 may predict a probability (y|x) of labels $y=(y_1, \ldots, y_u)$ given acoustic features $x=(x_1, \ldots, x_t)$. During inference, the ASR model 1150 can generate an N-best list using, for example, a beam search decoding algorithm. The ASR model 1150 may include an encoder 1110, a prediction network 1120, a joint network 1130, and a softmax 1140. The encoder 1110 may be similar or analogous to an acoustic model (e.g., similar to the acoustic model 1153 described below), and may process a sequence of acoustic input features to generate encoded hidden representations. The prediction network 1120 may be similar or analogous to a language model (e.g., similar to the language model 1154 described below), and may process the previous output label predictions, and map them to corresponding hidden representations. The joint network 1130 may be, for example, a feed forward NN that may process hidden representations from both the encoder 1110 and prediction network 1120, and predict output label probabilities. The softmax 1140 may be a function implemented (e.g., as a layer of the joint network 1130) to normalize the predicted output probabilities.

In some implementations, the speech recognition engine 1158 may attempt to match received feature vectors in the audio data 1028 to language acoustic units (e.g., phonemes) and words as known in the stored acoustic models 1153, language models 1154, and/or FST(s) 1155. For example, audio data 1028 may be processed by one or more acoustic model(s) 1153 to determine acoustic unit data. The acoustic unit data may include indicators of acoustic units detected in the audio data 1028 by the ASR component 1050. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1154 (and/or using FST 1155) to determine ASR output data 1165. The ASR output data 1165 can include one or more hypotheses. One or more of the hypotheses represented in the ASR output data 1165 may then be sent to further components (such as the NLU component 1060) for further processing as discussed herein. The ASR output data 1165 may include representations of text of an utterance, such as words, subword units, or the like.

The speech recognition engine 1158 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 1050 will output ASR hypotheses that make sense grammatically. The specific models used may be general models or may be models corresponding to a particular domain, such as music, banking, etc.

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1158 may use the acoustic model(s) 1153 to attempt to match received audio feature vectors to words or subword acoustic units. An acoustic unit may be a senone, phoneme, phoneme in context, syllable, part of a syllable, syllable in context, or any other such portion of a word. The speech recognition engine 1158 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 1050 outputs ASR hypotheses that make sense grammatically.

The speech recognition engine 1158 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1158, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1158 may also compute scores of branches of the paths based on language models or grammars. Language modeling involves determining scores for what words are likely to be used together to form coherent words and sentences. Application of a language model may improve the likelihood that the ASR component 1050 correctly interprets the speech contained in the audio data. For example, for an input audio sounding like "hello," acoustic model processing that returns the potential phoneme paths of "HELO", "HALO", and "Y EL O" may be adjusted by a language model to adjust the recognition scores of "H E L O" (interpreted as the word "hello"), "H A L O" (interpreted as the word "halo"), and "Y EL O" (interpreted as the word "yellow") based on the language context of each word within the spoken utterance.

Figure 12:
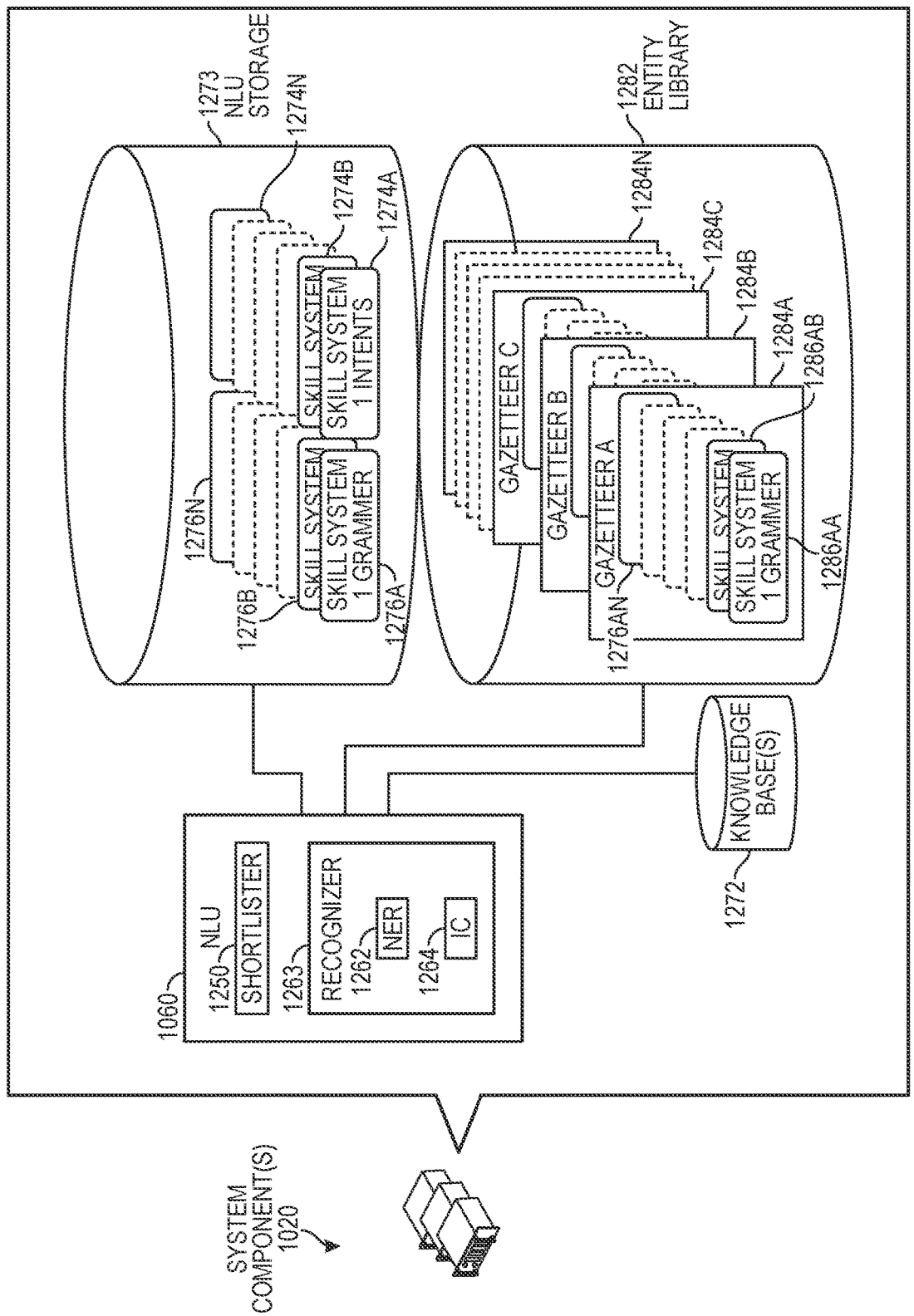
FIG. 12 is a conceptual diagram of how natural language processing is performed, in accordance with implementations of the present disclosure.
Figure 13:
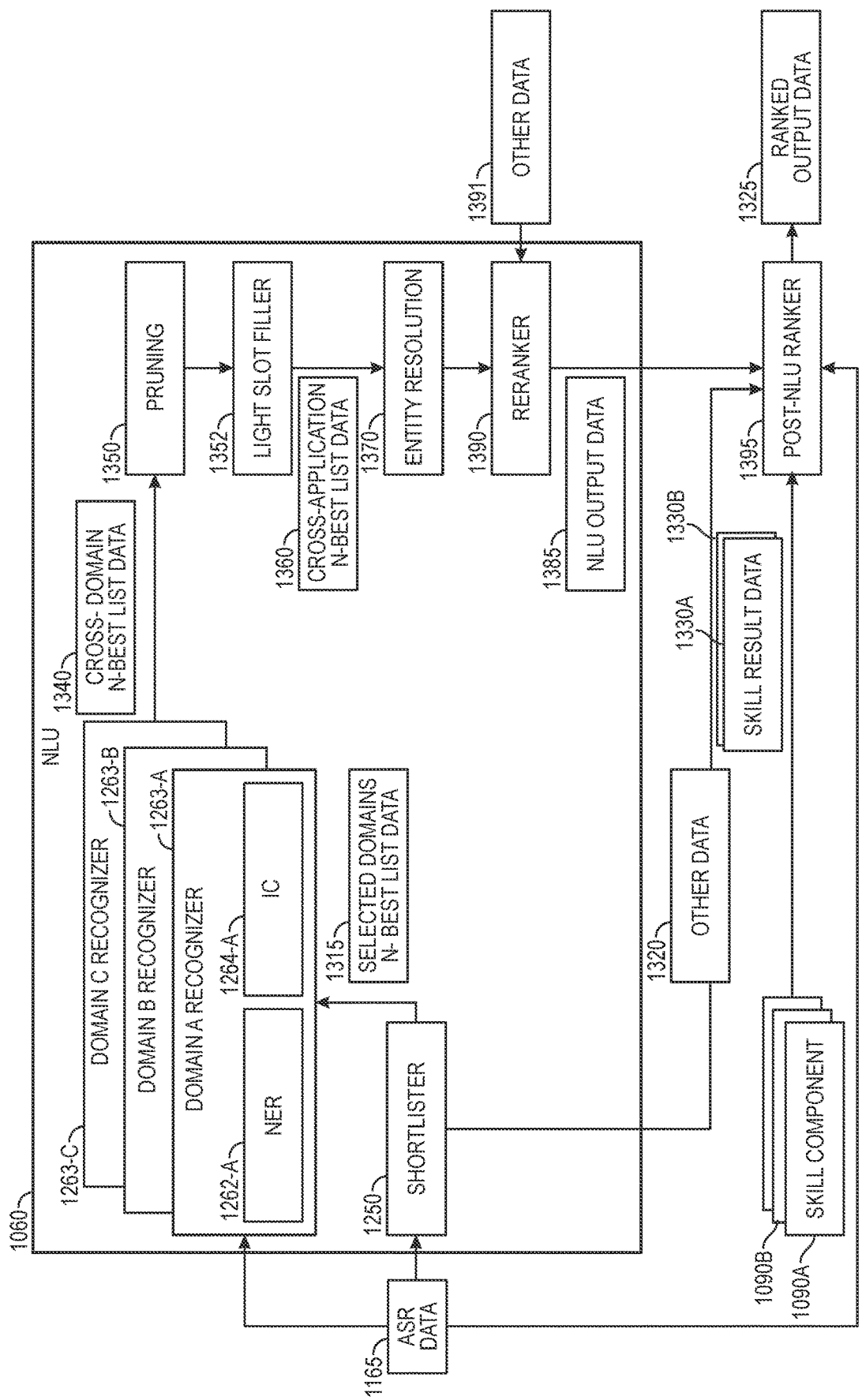
FIG. 13 is a conceptual diagram of how natural language processing is performed, in accordance with implementations of the present disclosure.

FIGS. 12 and 13 illustrates how the NLU component 1060 may perform NLU processing. FIG. 12 is a conceptual diagram of how natural language processing is performed, according to implementations of the present disclosure. And FIG. 13 is a conceptual diagram of how natural language processing is performed, according to implementations of the present disclosure.

FIG. 12 illustrates how NLU processing is performed on text data. The NLU component 1060 may process text data including several ASR hypotheses of a single user input. For example, if the ASR component 1050 outputs text data including an n-best list of ASR hypotheses, the NLU component 1060 may process the text data with respect to all (or a portion of) the ASR hypotheses represented therein.

The NLU component 1060 may annotate text data by parsing and/or tagging the text data. For example, for the text data "tell me the weather for Seattle," the NLU component 1060 may tag "tell me the weather for Seattle" as an <OutputWeather> intent as well as separately tag "Seattle" as a location for the weather information.

The NLU component 1060 may include a shortlister component 1250. The shortlister component 1250 selects skills that may execute with respect to ASR output data 1165 input to the NLU component 1060 (e.g., applications that may execute with respect to the user input). The ASR output data 1165 (which may also be referred to as ASR output data 1165) may include representations of text of an utterance, such as words, subword units, or the like. The shortlister component 1250 thus limits downstream, more resource intensive NLU processes to being performed with respect to skills that may execute with respect to the user input.

Without a shortlister component 1250, the NLU component 1060 may process ASR output data 1165 input thereto with respect to every skill of the system, either in parallel, in series, or using some combination thereof. By implementing a shortlister component 1250, the NLU component 1060 may process ASR output data 1165 with respect to only the skills that may execute with respect to the user input. This reduces total compute power and latency attributed to NLU processing.

The shortlister component 1250 may include one or more trained models. The model(s) may be trained to recognize various forms of user inputs that may be received by the device 1010 and/or system component(s) 1020. For example, during a training period, the skill support system component(s) 1025 associated with a skill may provide the system 1000 with training text data representing sample user inputs that may be provided by a user to invoke the skill. For example, for a ride sharing skill, the skill support system component(s) 1025 associated with the ride sharing skill may provide the system 1000 with training text data including text corresponding to "get me a cab to [location]," "get me a ride to [location]," "book me a cab to [location]," "book me a ride to [location]," etc. The one or more trained models that will be used by the shortlister component 1250 may be trained, using the training text data representing sample user inputs, to determine other potentially related user input structures that users may try to use to invoke the particular skill. During training, the system 1000 may solicit the skill support system component(s) 1025 associated with the skill regarding whether the determined other user input structures are permissible, from the perspective of the skill support system component(s) 1025, to be used to invoke the skill. The alternate user input structures may be derived by one or more trained models during model training and/or may be based on user input structures provided by different skills. The skill support system component(s) 1025 associated with a particular skill may also provide the system 1000 with training text data indicating grammar and annotations. The system 1000 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1250 may be trained with respect to a different skill. Alternatively, the shortlister component 1250 may use one trained model per domain, such as one trained model for skills associated with a weather domain, one trained model for skills associated with a ride sharing domain, etc.

The system 1000 may use the sample user inputs provided by the skill support system component(s) 1025, and related sample user inputs potentially determined during training, as binary examples to train a model associated with a skill associated with the skill support system component(s) 1025. The model associated with the particular skill may then be operated at runtime by the shortlister component 1250. For example, some sample user inputs may be positive examples (e.g., user inputs that may be used to invoke the skill). Other sample user inputs may be negative examples (e.g., user inputs that may not be used to invoke the skill).

As described above, the shortlister component 1250 may include a different trained model for each skill of the system, a different trained model for each domain, or some other combination of trained model(s). For example, the shortlister component 1250 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1250 to output indications of only a portion of the skills that the ASR output data 1165 may relate to. For example, a user input may correspond to "tell me about Tom Collins." If the model is clustered based on domain, the shortlister component 1250 may determine the user input corresponds to a recipe skill (e.g., a drink recipe) even though the user input may also correspond to an information skill (e.g., including information about a person named Tom Collins).

The NLU component 1060 may include one or more recognizers 1263. In at least some implementations, a recognizer 1263 may be associated with the skill support system component(s) 1025 (e.g., the recognizer may be configured to interpret text data to correspond to the skill support system component(s) 1025). In at least some other examples, a recognizer 1263 may be associated with a domain such as smart home, video, music, weather, custom, etc. (e.g., the recognizer may be configured to interpret text data to correspond to the domain).

If the shortlister component 1250 determines ASR output data 1165 is potentially associated with multiple domains, the recognizers 1263 associated with the domains may process the ASR output data 1165, while recognizers 1263 not indicated in the shortlister component's 1250 output may not process the ASR output data 1165. The "shortlisted" recognizers 1263 may process the ASR output data 1165 in parallel, in series, partially in parallel, etc. For example, if ASR output data 1165 potentially relates to both a communications domain and a music domain, a recognizer associated with the communications domain may process the ASR output data 1165 in parallel, or partially in parallel, with a recognizer associated with the music domain processing the ASR output data 1165.

Each recognizer 1263 may include a named entity recognition (NER) component 1262. The NER component 1262 attempts to identify grammars and lexical information that may be used to construe meaning with respect to text data input therein. The NER component 1262 identifies portions of text data that correspond to a named entity associated with a domain, associated with the recognizer 1263 implementing the NER component 1262. The NER component 1262 (or other component of the NLU component 1060) may also determine whether a word refers to an entity whose identity is not explicitly mentioned in the text data, for example "him," "her," "it" or other anaphora, exophora, or the like.

Each recognizer 1263, and more specifically each NER component 1262, may be associated with a particular grammar database 1276, a particular set of intents/actions 1274, and a particular personalized lexicon 1286. The grammar databases 1276, and intents/actions 1274 may be stored in an NLU storage 1273. Each gazetteer 1284 may include domain/skill-indexed lexical information associated with a particular user and/or device 1010. For example, a Gazetteer A (1284A) includes skill-indexed lexical information 1286AA to 1286AN. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1262 applies grammar information 1276 and lexical information 1286 associated with a domain (associated with the recognizer 1263 implementing the NER component 1262) to determine a mention of one or more entities in text data. In this manner, the NER component 1262 identifies "slots" (each corresponding to one or more particular words in text data) that may be useful for later processing. The NER component 1262 may also label each slot with a type (e.g., noun, place, city, artist name, song name, etc.).

Each grammar database 1276 includes the names of entities (i.e., nouns) commonly found in speech about the particular domain to which the grammar database 1276 relates, whereas the lexical information 1286 is personalized to the user and/or the device 1010 from which the user input originated. For example, a grammar database 1276 associated with a shopping domain may include a database of words commonly used when people discuss shopping.

A downstream process called entity resolution links a slot of text data to a specific entity known to the system. To perform entity resolution, the NLU component 1060 may utilize gazetteer information (1284A-1284N) stored in an entity library storage 1282. The gazetteer information 1284 may be used to match text data (representing a portion of the user input) with text data representing known entities, such as song titles, contact names, etc. Gazetteers 1284 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1263 may also include an intent classification (IC) component 1264. An IC component 1264 parses text data to determine an intent(s) (associated with the domain associated with the recognizer 1263 implementing the IC component 1264) that potentially represents the user input. An intent represents to an action a user desires be performed. An IC component 1264 may communicate with a database 1274 of words linked to intents. For example, a music intent database may link words and phrases such as "quiet," "volume off," and "mute" to a <Mute> intent. An IC component 1264 identifies potential intents by comparing words and phrases in text data (representing at least a portion of the user input) to the words and phrases in an intents database 1274 (associated with the domain that is associated with the recognizer 1263 implementing the IC component 1264).

The intents identifiable by a specific IC component 1264 are linked to domain-specific (i.e., the domain associated with the recognizer 1263 implementing the IC component 1264) grammar frameworks 1276 with "slots" to be filled. Each slot of a grammar framework 1276 corresponds to a portion of text data that the system believes corresponds to an entity. For example, a grammar framework 1276 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1276 may not be structured as sentences, but rather based on associating slots with grammatical tags.

For example, an NER component 1262 may parse text data to identify words as subject, object, verb, preposition, etc. based on grammar rules and/or models prior to recognizing named entities in the text data. An IC component 1264 (implemented by the same recognizer 1263 as the NER component 1262) may use the identified verb to identify an intent. The NER component 1262 may then determine a grammar model 1276 associated with the identified intent. For example, a grammar model 1276 for an intent corresponding to <Play Music> may specify a list of slots applicable to play the identified "object" and any object modifier (e.g., a prepositional phrase), such as {Artist Name}, {Album Name}, {Song name}, etc. The NER component 1262 may then search corresponding fields in a lexicon 1286 (associated with the domain associated with the recognizer 1263 implementing the NER component 1262), attempting to match words and phrases in text data the NER component 1262 previously tagged as a grammatical object or object modifier with those identified in the lexicon 1286.

An NER component 1262 may perform semantic tagging, which is the labeling of a word or combination of words according to their type/semantic meaning. An NER component 1262 may parse text data using heuristic grammar rules, or a model may be constructed using techniques such as Hidden Markov Models, maximum entropy models, log linear models, conditional random fields (CRF), and the like. For example, an NER component 1262 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1262 identifies "Play" as a verb based on a word database associated with the music domain, which an IC component 1264 (also implemented by the music domain recognizer) may determine corresponds to a <PlayMusic> intent. At this stage, no determination has been made as to the meaning of "mother's little helper" or "the rolling stones," but based on grammar rules and models, the NER component 1262 has determined the text of these phrases relates to the grammatical object (i.e., entity) of the user input represented in the text data.

An NER component 1262 may tag text data to attribute meaning thereto. For example, an NER component 1262 may tag "play mother's little helper by the rolling stones" as: {domain} Music, {intent}<PlayMusic>, {artist name} rolling stones, {media type} SONG, and {song title} mother's little helper. For further example, the NER component 1262 may tag "play songs by the rolling stones" as: {domain} Music, {intent} <PlayMusic>, {artist name} rolling stones, and {media type} SONG.

The shortlister component 1250 may receive ASR output data 1165 output from the ASR component 1050. The ASR component 1050 may embed the ASR output data 1165 into a form processable by a trained model(s) using sentence embedding techniques as known in the art. Sentence embedding results in the ASR output data 1165 including text in a structure that enables the trained models of the shortlister component 1250 to operate on the ASR output data 1165. For example, an embedding of the ASR output data 1165 may be a vector representation of the ASR output data 1165.

The shortlister component 1250 may make binary determinations (e.g., yes or no) regarding which domains relate to the ASR output data 1165. The shortlister component 1250 may make such determinations using the one or more trained models described herein above. If the shortlister component 1250 implements a single trained model for each domain, the shortlister component 1250 may simply run the models that are associated with enabled domains as indicated in a user profile associated with the device 1010 and/or user that originated the user input.

The shortlister component 1250 may generate n-best list data 1315 representing domains that may execute with respect to the user input represented in the ASR output data 1165. The size of the n-best list represented in the n-best list data 1315 is configurable. In an example, the n-best list data 1315 may indicate every domain of the system as well as contain an indication, for each domain, regarding whether the domain is likely capable to execute the user input represented in the ASR output data 1165. In another example, instead of indicating every domain of the system, the n-best list data 1315 may only indicate the domains that are likely to be able to execute the user input represented in the ASR output data 1165. In yet another example, the shortlister component 1250 may implement thresholding such that the n-best list data 1315 may indicate no more than a maximum number of domains that may execute the user input represented in the ASR output data 1165. In an example, the threshold number of domains that may be represented in the n-best list data 1315 is ten. In another example, the domains included in the n-best list data 1315 may be limited by a threshold a score, where only domains indicating a likelihood to handle the user input is above a certain score (as determined by processing the ASR output data 1165 by the shortlister component 1250 relative to such domains) are included in the n-best list data 1315.

The ASR output data 1165 may correspond to more than one ASR hypothesis. When this occurs, the shortlister component 1250 may output a different n-best list (represented in the n-best list data 1315) for each ASR hypothesis. Alternatively, the shortlister component 1250 may output a single n-best list representing the domains that are related to the multiple ASR hypotheses represented in the ASR output data 1165.

As indicated above, the shortlister component 1250 may implement thresholding such that an n-best list output therefrom may include no more than a threshold number of entries. If the ASR output data 1165 includes more than one ASR hypothesis, the n-best list output by the shortlister component 1250 may include no more than a threshold number of entries irrespective of the number of ASR hypotheses output by the ASR component 1050. Alternatively, or in addition, the n-best list output by the shortlister component 1250 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1165, the shortlister component 1250 may generate confidence scores representing likelihoods that domains relate to the ASR output data 1165.

If the shortlister component 1250 implements a different trained model for each domain, the shortlister component 1250 may generate a different confidence score for each individual domain trained model that is run. If the shortlister component 1250 runs the models of every domain when ASR output data 1165 is received, the shortlister component 1250 may generate a different confidence score for each domain of the system. If the shortlister component 1250 runs the models of only the domains that are associated with skills indicated as enabled in a user profile associated with the device 1010 and/or user that originated the user input, the shortlister component 1250 may only generate a different confidence score for each domain associated with at least one enabled skill. If the shortlister component 1250 implements a single trained model with domain specifically trained portions, the shortlister component 1250 may generate a different confidence score for each domain who's specifically trained portion is run. The shortlister component 1250 may perform matrix vector modification to obtain confidence scores for all domains of the system in a single instance of processing of the ASR output data 1165.

N-best list data 1315 including confidence scores that may be output by the shortlister component 1250 may be represented as, for example:

Search domain, 0.67
Recipe domain, 0.62
Information domain, 0.57
Shopping domain, 0.42

As indicated, the confidence scores output by the shortlister component 1250 may be numeric values. The confidence scores output by the shortlister component 1250 may alternatively be binned values (e.g., high, medium, low).

The n-best list may only include entries for domains having a confidence score satisfying (e.g., equaling or exceeding) a minimum threshold confidence score. Alternatively, the shortlister component 1250 may include entries for all domains associated with user enabled skills, even if one or more of the domains are associated with confidence scores that do not satisfy the minimum threshold confidence score.

The shortlister component 1250 may consider other data 1320 when determining which domains may relate to the user input represented in the ASR output data 1165 as well as respective confidence scores. The other data 1320 may include usage history data associated with the device 1010 and/or user that originated the user input. For example, a confidence score of a domain may be increased if user inputs originated by the device 1010 and/or user routinely invoke the domain. Conversely, a confidence score of a domain may be decreased if user inputs originated by the device 1010 and/or user rarely invoke the domain. Thus, the other data 1320 may include an indicator of the user associated with the ASR output data 1165, for example as determined by a user recognition component.

The other data 1320 may be character embedded prior to being input to the shortlister component 1250. The other data 1320 may alternatively be embedded using other techniques known in the art prior to being input to the shortlister component 1250.

The other data 1320 may also include data indicating the domains associated with skills that are enabled with respect to the device 1010 and/or user that originated the user input. The shortlister component 1250 may use such data to determine which domain-specific trained models to run. That is, the shortlister component 1250 may determine to only run the trained models associated with domains that are associated with user-enabled skills. The shortlister component 1250 may alternatively use such data to alter confidence scores of domains.

As an example, considering two domains, a first domain associated with at least one enabled skill and a second domain not associated with any user-enabled skills of the user that originated the user input, the shortlister component 1250 may run a first model specific to the first domain as well as a second model specific to the second domain. Alternatively, the shortlister component 1250 may run a model configured to determine a score for each of the first and second domains. The shortlister component 1250 may determine a same confidence score for each of the first and second domains in the first instance. The shortlister component 1250 may then alter those confidence scores based on which domains are associated with at least one skill enabled by the present user. For example, the shortlister component 1250 may increase the confidence score associated with the domain associated with at least one enabled skill while leaving the confidence score associated with the other domain the same. Alternatively, the shortlister component 1250 may leave the confidence score associated with the domain associated with at least one enabled skill the same while decreasing the confidence score associated with the other domain. Moreover, the shortlister component 1250 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 1071. When the shortlister component 1250 receives the ASR output data 1165, the shortlister component 1250 may determine whether profile data associated with the user and/or device 1010 that originated the command includes an indication of enabled skills.

The other data 1320 may also include data indicating the type of the device 1010. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1250 may use such data to determine which domain-specific trained models to run. For example, if the device 1010 corresponds to a displayless type device, the shortlister component 1250 may determine not to run trained models specific to domains that output video data. The shortlister component 1250 may alternatively use such data to alter confidence scores of domains.

As an example, considering two domains, one that outputs audio data and another that outputs video data, the shortlister component 1250 may run a first model specific to the domain that generates audio data as well as a second model specific to the domain that generates video data. Alternatively, the shortlister component 1250 may run a model configured to determine a score for each domain. The shortlister component 1250 may determine a same confidence score for each of the domains in the first instance. The shortlister component 1250 may then alter the original confidence scores based on the type of the device 1010 that originated the user input corresponding to the ASR output data 1165. For example, if the device 1010 is a displayless device, the shortlister component 1250 may increase the confidence score associated with the domain that generates audio data while leaving the confidence score associated with the domain that generates video data the same. Alternatively, if the device 1010 is a displayless device, the shortlister component 1250 may leave the confidence score associated with the domain that generates audio data the same while decreasing the confidence score associated with the domain that generates video data. Moreover, if the device 1010 is a displayless device, the shortlister component 1250 may increase the confidence score associated with the domain that generates audio data as well as decrease the confidence score associated with the domain that generates video data.

The type of device information represented in the other data 1320 may represent output capabilities of the device to be used to output content to the user, which may not necessarily be the user input originating device. For example, a user may input a spoken user input corresponding to "play Game of Thrones" to a device not including a display. As another example, the user may think or focus on the phrase "play Game of Thrones" and a user device worn by or otherwise coupled to the user may generate user data from electrical data generated by the brain of the user. The system may determine a smart TV or other display device (associated with the same user profile) for outputting Game of Thrones. Thus, the other data 1320 may represent the smart TV of other display device, and not the displayless device that captured the spoken user input and/or the user device that received the electrical activity.

The other data 1320 may also include data indicating the user input originating device's speed, location, or other mobility information. For example, the device may correspond to a vehicle including a display. If the vehicle is moving, the shortlister component 1250 may decrease the confidence score associated with a domain that generates video data as it may be undesirable to output video content to a user while the user is driving. The device 1010 may output data to the system component(s) 1020 indicating when the device is moving.

The other data 1320 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1250 may use such data to alter confidence scores of domains. For example, the shortlister component 1250 may run a first model specific to a first domain as well as a second model specific to a second domain. Alternatively, the shortlister component 1250 may run a model configured to determine a score for each domain. The shortlister component 1250 may also determine a same confidence score for each of the domains in the first instance. The shortlister component 1250 may then alter the original confidence scores based on the first domain being invoked to cause the system to output content while the current user input was received. Based on the first domain being invoked, the shortlister component 1250 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1315 generated by the shortlister component 1250 as well as the different types of other data 1320 considered by the shortlister component 1250 are configurable. For example, the shortlister component 1250 may update confidence scores as more other data 1320 is considered. For further example, the n-best list data 1315 may exclude relevant domains if thresholding is implemented. Thus, for example, the shortlister component 1250 may include an indication of a domain in the n-best list 1315 unless the shortlister component 1250 is one hundred percent confident that the domain may not execute the user input represented in the ASR output data 1165 (e.g., the shortlister component 1250 determines a confidence score of zero for the domain).

The shortlister component 1250 may send the ASR output data 1165 to recognizers 1263 associated with domains represented in the n-best list data 1315. Alternatively, the shortlister component 1250 may send the n-best list data 1315 or some other indicator of the selected subset of domains to another component (such as the orchestrator component 1030) which may in turn send the ASR output data 1165 to the recognizers 1263 corresponding to the domains included in the n-best list data 1315 or otherwise indicated in the indicator. If the shortlister component 1250 generates an n-best list representing domains without any associated confidence scores, the shortlister component 1250/orchestrator component 1030 may send the ASR output data 1165 to recognizers 1263 associated with domains that the shortlister component 1250 determines may execute the user input. If the shortlister component 1250 generates an n-best list representing domains with associated confidence scores, the shortlister component 1250/orchestrator component 1030 may send the ASR output data 1165 to recognizers 1263 associated with domains associated with confidence scores satisfying (e.g., meeting or exceeding) a threshold minimum confidence score.

A recognizer 1263 may output tagged text data generated by an NER component 1262 and an IC component 1264, as described herein above. The NLU component 1060 may compile the output tagged text data of the recognizers 1263 into a single cross-domain n-best list 1340 and may send the cross-domain n-best list 1340 to a pruning component 1350. Each entry of tagged text (e.g., each NLU hypothesis) represented in the cross-domain n-best list data 1340 may be associated with a respective score indicating a likelihood that the NLU hypothesis corresponds to the domain associated with the recognizer 1263 from which the NLU hypothesis was output. For example, the cross-domain n-best list data 1340 may be represented as (with each line corresponding to a different NLU hypothesis):

- [0.95] Intent: <PlayMusic> ArtistName: Beethoven SongName: Waldstein Sonata
- [0.70] Intent: <Play Video> ArtistName: Beethoven VideoName: Waldstein Sonata
- [0.01] Intent: <PlayMusic> ArtistName: Beethoven AlbumName: Waldstein Sonata
- [0.01] Intent: <PlayMusic> SongName: Waldstein Sonata The pruning component 1350 may sort the NLU hypotheses represented in the cross-domain n-best list data 1340 according to their respective scores. The pruning component 1350 may perform score thresholding with respect to the cross-domain NLU hypotheses. For example, the pruning component 1350 may select NLU hypotheses associated with scores satisfying (e.g., meeting and/or exceeding) a threshold score. The pruning component 1350 may also or alternatively perform number of NLU hypothesis thresholding. For example, the pruning component 1350 may select the top scoring NLU hypothesis(es). The pruning component 1350 may output a portion of the NLU hypotheses input thereto. The purpose of the pruning component 1350 is to create a reduced list of NLU hypotheses so that downstream, more resource intensive, processes may only operate on the NLU hypotheses that most likely represent the user's intent.

The NLU component 1060 may include a light slot filler component 1352. The light slot filler component 1352 can take text from slots represented in the NLU hypotheses output by the pruning component 1350 and alter them to make the text more easily processed by downstream components. The light slot filler component 1352 may perform low latency operations that do not involve heavy operations such as reference to a knowledge base (e.g., 1272). The purpose of the light slot filler component 1352 is to replace words with other words or values that may be more easily understood by downstream components. For example, if a NLU hypothesis includes the word "tomorrow," the light slot filler component 1352 may replace the word "tomorrow" with an actual date for purposes of downstream processing. Similarly, the light slot filler component 1352 may replace the word "CD" with "album" or the words "compact disc." The replaced words are then included in the cross-domain n-best list data 1360.

The cross-domain n-best list data 1360 may be input to an entity resolution component 1370. The entity resolution component 1370 can apply rules or other instructions to standardize labels or tokens from previous stages into an intent/slot representation. The precise transformation may depend on the domain. For example, for a travel domain, the entity resolution component 1370 may transform text corresponding to "Boston airport" to the standard BOS three-letter code referring to the airport. The entity resolution component 1370 can refer to a knowledge base (e.g., 1272) that is used to specifically identify the precise entity referred to in each slot of each NLU hypothesis represented in the cross-domain n-best list data 1360. Specific intent/slot combinations may also be tied to a particular source, which may then be used to resolve the text. In the example "play songs by the stones," the entity resolution component 1370 may reference a personal music catalog, Amazon Music account, a user profile, or the like. The entity resolution component 1370 may output an altered n-best list that is based on the cross-domain n-best list 1360 but that includes more detailed information (e.g., entity IDs) about the specific entities mentioned in the slots and/or more detailed slot data that can eventually be used by a skill. The NLU component 1060 may include multiple entity resolution components 1370 and each entity resolution component 1370 may be specific to one or more domains.

The NLU component 1060 may include a reranker 1390. The reranker 1390 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1370.

The reranker 1390 may apply re-scoring, biasing, or other techniques. The reranker 1390 may consider not only the data output by the entity resolution component 1370, but may also consider other data 1391. The other data 1391 may include a variety of information. For example, the other data 1391 may include skill rating or popularity data. For example, if one skill has a high rating, the reranker 1390 may increase the score of a NLU hypothesis that may be processed by the skill. The other data 1391 may also include information about skills that have been enabled by the user that originated the user input. For example, the reranker 1390 may assign higher scores to NLU hypothesis that may be processed by enabled skills than NLU hypothesis that may be processed by non-enabled skills. The other data 1391 may also include data indicating user usage history, such as if the user that originated the user input regularly uses a particular skill or does so at particular times of day. The other data 1391 may additionally include data indicating date, time, location, weather, type of device 1010, user identifier, context, as well as other information. For example, the reranker 1390 may consider when any particular skill is currently active (e.g., music being played, a game being played, etc.).

As illustrated and described, the entity resolution component 1370 is implemented prior to the reranker 1390. The entity resolution component 1370 may alternatively be implemented after the reranker 1390. Implementing the entity resolution component 1370 after the reranker 1390 limits the NLU hypotheses processed by the entity resolution component 1370 to only those hypotheses that successfully pass through the reranker 1390.

The reranker 1390 may be a global reranker (e.g., one that is not specific to any particular domain). Alternatively, the NLU component 1060 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 1060 may perform NLU processing described above with respect to domains associated with skills wholly implemented as part of the system 1000 (e.g., designated 1090 in FIG. 1). The NLU component 1060 may separately perform NLU processing described above with respect to domains associated with skills that are at least partially implemented as part of the skill support system component(s) 1025. In an example, the shortlister component 1250 may only process with respect to these latter domains. Results of these two NLU processing paths may be merged into NLU results data 1385, which may be sent to a post-NLU ranker 1395, which may be implemented by the system 1000.

The post-NLU ranker 1395 may include a statistical component that produces a ranked list of intent/skill pairs with associated confidence scores. Each confidence score may indicate an adequacy of the skill's execution of the intent with respect to NLU results data associated with the skill. The post-NLU ranker 1395 may operate one or more trained models configured to process the NLU results data 1385, skill result data 1330, and the other data 1320 in order to output ranked output data 1325. The ranked output data 1325 may include an n-best list where the NLU hypotheses in the NLU results data 1385 are reordered such that the n-best list in the ranked output data 1325 represents a prioritized list of skills to respond to a user input as determined by the post-NLU ranker 1395. The ranked output data 1325 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1395 enables the system to better determine the best skill to execute the user input. For example, first and second NLU hypotheses in the NLU results data 1385 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1395 (or other scheduling component such as orchestrator component 1030) may solicit the first skill and the second skill to provide potential result data 1330 based on the first NLU hypothesis and the second NLU hypothesis, respectively. For example, the post-NLU ranker 1395 may send the first NLU hypothesis to the first skill component 1090A along with a request for the first skill component 1090A to at least partially execute with respect to the first NLU hypothesis. The post-NLU ranker 1395 may also send the second NLU hypothesis to the second skill component 1090B along with a request for the second skill component 1090B to at least partially execute with respect to the second NLU hypothesis. The post-NLU ranker 1395 receives, from the first skill component 1090A, first skill result data 1330A generated from the first skill component's 1090A execution with respect to the first NLU hypothesis. The post-NLU ranker 1395 also receives, from the second skill component 1090B, second results data 1330B generated from the second skill component's 1090B execution with respect to the second NLU hypothesis.

The result data 1330 may include various portions. For example, the result data 1330 may include content (e.g., audio data, text data, and/or video data) to be output to a user. The result data 1330 may also include a unique identifier used by the system component(s) 1020 and/or the skill support system component(s) 1025 to locate the data to be output to a user. The result data 1330 may also include an instruction. For example, if the user input corresponds to "turn on the light," the result data 1330 may include an instruction causing the system to turn on a light associated with a profile of the device 1010 and/or user.

The post-NLU ranker 1395 may consider the first result data 1330A and the second result data 1330B to alter the first confidence score and the second confidence score of the first NLU hypothesis and the second NLU hypothesis, respectively. That is, the post-NLU ranker 1395 may generate a third confidence score based on the first result data 1330A and the first confidence score. The third confidence score may correspond to how likely the post-NLU ranker 1395 determines the first skill will correctly respond to the user input. The post-NLU ranker 1395 may also generate a fourth confidence score based on the second result data 1330B and the second confidence score. One skilled in the art will appreciate that a first difference between the third confidence score and the fourth confidence score may be greater than a second difference between the first confidence score and the second confidence score. The post-NLU ranker 1395 may also consider the other data 1320 to generate the third confidence score and the fourth confidence score. While it has been described that the post-NLU ranker 1395 may alter the confidence scores associated with first and second NLU hypotheses, one skilled in the art will appreciate that the post-NLU ranker 1395 may alter the confidence scores of more than two NLU hypotheses. The post-NLU ranker 1395 may select the result data 1330 associated with the skill component 1090 with the highest altered confidence score to be the data output in response to the current user input. The post-NLU ranker 1395 may also consider the ASR output data 1165 to alter the NLU hypotheses confidence scores.

The orchestrator component 1030 may, prior to sending the NLU results data 1385 to the post-NLU ranker 1395, associate intents in the NLU hypotheses with skill components 1090. For example, if a NLU hypothesis includes a <PlayMusic> intent, the orchestrator component 1030 may associate the NLU hypothesis with one or more skill components 1090 that can execute the <PlayMusic> intent. Thus, the orchestrator component 1030 may send the NLU results data 1385, including NLU hypotheses paired with skill components 1090, to the post-NLU ranker 1395. In response to ASR output data 1165 corresponding to "what should I do for dinner today," the orchestrator component 1030 may generates pairs of skill components 1090 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 1395 queries each skill component 1090, paired with a NLU hypothesis in the NLU results data 1385, to provide result data 1330 based on the NLU hypothesis with which it is associated. That is, with respect to each skill, the post-NLU ranker 1395 colloquially asks each skill "if given this NLU hypothesis, what would you do with it." According to the above example, the post-NLU ranker 1395 may send skill components 1090 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 1395 may query each of the skill components 1090 in parallel or substantially in parallel.

A skill component 1090 may provide the post-NLU ranker 1395 with various data and indications in response to the post-NLU ranker 1395 soliciting the skill component 1090 for result data 1330. A skill component 1090 may simply provide the post-NLU ranker 1395 with an indication of whether or not the skill can execute with respect to the NLU hypothesis it received. A skill component 1090 may also or alternatively provide the post-NLU ranker 1395 with output data generated based on the NLU hypothesis it received. In some situations, a skill component 1090 may need further information in addition to what is represented in the received NLU hypothesis to provide output data responsive to the user input. In these situations, the skill component 1090 may provide the post-NLU ranker 1395 with result data 1330 indicating slots of a framework that the skill component 1090 further needs filled or entities that the skill component 1090 further needs resolved prior to the skill component 1090 being able to provided result data 1330 responsive to the user input. The skill component 1090 may also provide the post-NLU ranker 1395 with an instruction and/or computer-generated speech indicating how the skill component 1090 recommends the system solicit further information needed by the skill component 1090. The skill component 1090 may further provide the post-NLU ranker 1395 with an indication of whether the skill component 1090 will have all needed information after the user provides additional information a single time, or whether the skill component 1090 will need the user to provide various kinds of additional information prior to the skill component 1090 having all needed information. According to the above example, skill components 1090 may provide the post-NLU ranker 1395 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1330 includes an indication provided by a skill component 1090 indicating whether or not the skill component 1090 can execute with respect to a NLU hypothesis; data generated by a skill component 1090 based on a NLU hypothesis; as well as an indication provided by a skill component 1090 indicating the skill component 1090 needs further information in addition to what is represented in the received NLU hypothesis.

The post-NLU ranker 1395 uses the result data 1330 provided by the skill components 1090 to alter the NLU processing confidence scores generated by the reranker 1390. That is, the post-NLU ranker 1395 uses the result data 1330 provided by the queried skill components 1090 to create larger differences between the NLU processing confidence scores generated by the reranker 1390. Without the post-NLU ranker 1395, the system may not be confident enough to determine an output in response to a user input, for example when the NLU hypotheses associated with multiple skills are too close for the system to confidently determine a single skill component 1090 to invoke to respond to the user input. For example, if the system does not implement the post-NLU ranker 1395, the system may not be able to determine whether to obtain output data from a general reference information skill or a medical information skill in response to a user input corresponding to "what is acne."

The post-NLU ranker 1395 may prefer skill components 1090 that provide result data 1330 responsive to NLU hypotheses over skill components 1090 that provide result data 1330 corresponding to an indication that further information is needed, as well as skill components 1090 that provide result data 1330 indicating they can provide multiple responses to received NLU hypotheses. For example, the post-NLU ranker 1395 may generate a first score for a first skill component 1090A that is greater than the first skill's NLU confidence score based on the first skill component 1090A providing result data 1330A including a response to a NLU hypothesis. For further example, the post-NLU ranker 1395 may generate a second score for a second skill component 1090B that is less than the second skill's NLU confidence score based on the second skill component 1090B providing result data 1330B indicating further information is needed for the second skill component 1090B to provide a response to a NLU hypothesis. Yet further, for example, the post-NLU ranker 1395 may generate a third score for a third skill component 1090C that is less than the third skill's NLU confidence score based on the third skill component 1090C providing result data 1330C indicating the third skill component 1090C can provide multiple responses to a NLU hypothesis.

The post-NLU ranker 1395 may consider other data 1320 in determining scores. The other data 1320 may include rankings associated with the queried skill components 1090. A ranking may be a system ranking or a user-specific ranking. A ranking may indicate a veracity of a skill from the perspective of one or more users of the system. For example, the post-NLU ranker 1395 may generate a first score for a first skill component 1090A that is greater than the first skill's NLU processing confidence score based on the first skill component 1090A being associated with a high ranking. For further example, the post-NLU ranker 1395 may generate a second score for a second skill component 1090B that is less than the second skill's NLU processing confidence score based on the second skill component 1090B being associated with a low ranking.

The other data 1320 may include information indicating whether or not the user that originated the user input has enabled one or more of the queried skill components 1090. For example, the post-NLU ranker 1395 may generate a first score for a first skill component 1090A that is greater than the first skill's NLU processing confidence score based on the first skill component 1090A being enabled by the user that originated the user input. For further example, the post-NLU ranker 1395 may generate a second score for a second skill component 1090B that is less than the second skill's NLU processing confidence score based on the second skill component 1090B not being enabled by the user that originated the user input. When the post-NLU ranker 1395 receives the NLU results data 1385, the post-NLU ranker 1395 may determine whether profile data, associated with the user and/or device that originated the user input, includes indications of enabled skills.

The other data 1320 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1395 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1395 may increase the NLU processing confidence score associated with a first skill configured to output visual data and/or decrease the NLU processing confidence score associated with a second skill configured to output audio data.

The other data 1320 may include information indicating the veracity of the result data 1330 provided by a skill component 1090. For example, if a user says, "tell me a recipe for pasta sauce," a first skill component 1090A may provide the post-NLU ranker 1395 with first result data 1330A corresponding to a first recipe associated with a five star rating and a second skill component 1090B may provide the post-NLU ranker 1395 with second result data 1330B corresponding to a second recipe associated with a one star rating. In this situation, the post-NLU ranker 1395 may increase the NLU processing confidence score associated with the first skill component 1090A based on the first skill component 1090A providing the first result data 1330A associated with the five star rating and/or decrease the NLU processing confidence score associated with the second skill component 1090B based on the second skill component 1090B providing the second result data 1330B associated with the one star rating.

The other data 1320 may include information indicating the type of device that originated the user input. For example, the device may correspond to a "hotel room" type if the device is located in a hotel room. If a user inputs a command corresponding to "order me food" to the device located in the hotel room, the post-NLU ranker 1395 may increase the NLU processing confidence score associated with a first skill component 1090A corresponding to a room service skill associated with the hotel and/or decrease the NLU processing confidence score associated with a second skill component 1090B corresponding to a food skill not associated with the hotel.

The other data 1320 may include information indicating a location of the device and/or user that originated the user input. The system may be configured with skill components 1090 that may only operate with respect to certain geographic locations. For example, a user may provide a user input corresponding to "when is the next train to Portland." A first skill component 1090A may operate with respect to trains that arrive at, depart from, and pass through Portland, Oregon. A second skill component 1090B may operate with respect to trains that arrive at, depart from, and pass through Portland, Maine. If the device and/or user that originated the user input is located in Seattle, Washington, the post-NLU ranker 1395 may increase the NLU processing confidence score associated with the first skill component 1090A and/or decrease the NLU processing confidence score associated with the second skill component 1090B. Likewise, if the device and/or user that originated the user input is located in Boston, Massachusetts, the post-NLU ranker 1395 may increase the NLU processing confidence score associated with the second skill component 1090B and/or decrease the NLU processing confidence score associated with the first skill component 1090A.

The other data 1320 may include information indicating a time of day. The system may be configured with skill components 1090 that operate with respect to certain times of day. For example, a user may provide a user input corresponding to "order me food." A first skill component 1090a may generate first result data 1330A corresponding to breakfast. A second skill component 1090B may generate second result data 1330B corresponding to dinner. If the system component(s) 1020 receives the user input in the morning, the post-NLU ranker 1395 may increase the NLU processing confidence score associated with the first skill component 1090A and/or decrease the NLU processing score associated with the second skill component 1090B. If the system component(s) 1020 receives the user input in the afternoon or evening, the post-NLU ranker 1395 may increase the NLU processing confidence score associated with the second skill component 1090B and/or decrease the NLU processing confidence score associated with the first skill component 1090A.

The other data 1320 may include information indicating user preferences. The system may include multiple skill components 1090 configured to execute in substantially the same manner. For example, a first skill component 1090A and a second skill component 1090B may both be configured to order food from respective restaurants. The system may store a user preference (e.g., in the profile storage 1071) that is associated with the user that provided the user input to the system component(s) 1020 as well as indicates the user prefers the first skill component 1090A over the second skill component 1090B. Thus, when the user provides a user input that may be executed by both the first skill component 1090A and the second skill component 1090B, the post-NLU ranker 1395 may increase the NLU processing confidence score associated with the first skill component 1090A and/or decrease the NLU processing confidence score associated with the second skill component 1090B.

The other data 1320 may include information indicating system usage history associated with the user that originated the user input. For example, the system usage history may indicate the user originates user inputs that invoke a first skill component 1090A more often than the user originates user inputs that invoke a second skill component 1090B. Based on this, if the present user input may be executed by both the first skill component 1090A and the second skill component 1090B, the post-NLU ranker 1395 may increase the NLU processing confidence score associated with the first skill component 1090A and/or decrease the NLU processing confidence score associated with the second skill component 1090B.

The other data 1320 may include information indicating a speed at which the device 1010 that originated the user input is traveling. For example, the device 1010 may be located in a moving vehicle, or may be a moving vehicle. When a device 1010 is in motion, the system may prefer audio outputs rather than visual outputs to decrease the likelihood of distracting the user (e.g., a driver of a vehicle). Thus, for example, if the device 1010 that originated the user input is moving at or above a threshold speed (e.g., a speed above an average user's walking speed), the post-NLU ranker 1395 may increase the NLU processing confidence score associated with a first skill component 1090A that generates audio data. The post-NLU ranker 1395 may also or alternatively decrease the NLU processing confidence score associated with a second skill component 1090B that generates image data or video data.

The other data 1320 may include information indicating how long it took a skill component 1090 to provide result data 1330 to the post-NLU ranker 1395. When the post-NLU ranker 1395 multiple skill components 1090 for result data 1330, the skill components 1090 may respond to the queries at different speeds. The post-NLU ranker 1395 may implement a latency budget. For example, if the post-NLU ranker 1395 determines a skill component 1090 responds to the post-NLU ranker 1395 within a threshold amount of time from receiving a query from the post-NLU ranker 1395, the post-NLU ranker 1395 may increase the NLU processing confidence score associated with the skill component 1090. Conversely, if the post-NLU ranker 1395 determines a skill component 1090 does not respond to the post-NLU ranker 1395 within a threshold amount of time from receiving a query from the post-NLU ranker 1395, the post-NLU ranker 1395 may decrease the NLU processing confidence score associated with the skill component 1090.

It has been described that the post-NLU ranker 1395 uses the other data 1320 to increase and decrease NLU processing confidence scores associated with various skill components 1090 that the post-NLU ranker 1395 has already requested result data from. Alternatively, the post-NLU ranker 1395 may use the other data 1320 to determine which skill components 1090 to request result data from. For example, the post-NLU ranker 1395 may use the other data 1320 to increase and/or decrease NLU processing confidence scores associated with skill components 1090 associated with the NLU results data 1385 output by the NLU component 1060. The post-NLU ranker 1395 may select n-number of top scoring altered NLU processing confidence scores. The post-NLU ranker 1395 may then request result data 1330 from only the skill components 1090 associated with the selected n-number of NLU processing confidence scores.

As described, the post-NLU ranker 1395 may request result data 1330 from all skill components 1090 associated with the NLU results data 1385 output by the NLU component 1060. Alternatively, the system component(s) 1020 may prefer result data 1330 from skills implemented entirely by the system component(s) 1020 rather than skills at least partially implemented by the skill support system component(s) 1025. Therefore, in the first instance, the post-NLU ranker 1395 may request result data 1330 from only skills associated with the NLU results data 1385 and entirely implemented by the system component(s) 1020. The post-NLU ranker 1395 may only request result data 1330 from skills associated with the NLU results data 1385, and at least partially implemented by the skill support system component(s) 1025, if none of the skills, wholly implemented by the system component(s) 1020, provide the post-NLU ranker 1395 with result data 1330 indicating either data response to the NLU results data 1385, an indication that the skill can execute the user input, or an indication that further information is needed.

As indicated above, the post-NLU ranker 1395 may request result data 1330 from multiple skill components 1090. If one of the skill components 1090 provides result data 1330 indicating a response to a NLU hypothesis and the other skills provide result data 1330 indicating either they cannot execute or they need further information, the post-NLU ranker 1395 may select the result data 1330 including the response to the NLU hypothesis as the data to be output to the user. If more than one of the skill components 1090 provides result data 1330 indicating responses to NLU hypotheses, the post-NLU ranker 1395 may consider the other data 1320 to generate altered NLU processing confidence scores, and select the result data 1330 of the skill associated with the greatest score as the data to be output to the user.

A system that does not implement the post-NLU ranker 1395 may select the highest scored NLU hypothesis in the NLU results data 1385. The system may send the NLU hypothesis to a skill component 1090 associated therewith along with a request for output data. In some situations, the skill component 1090 may not be able to provide the system with output data. This results in the system indicating to the user that the user input could not be processed even though another skill associated with lower ranked NLU hypothesis could have provided output data responsive to the user input.

The post-NLU ranker 1395 reduces instances of the aforementioned situation. As described, the post-NLU ranker 1395 queries multiple skills associated with the NLU results data 1385 to provide result data 1330 to the post-NLU ranker 1395 prior to the post-NLU ranker 1395 ultimately determining the skill component 1090 to be invoked to respond to the user input. Some of the skill components 1090 may provide result data 1330 indicating responses to NLU hypotheses while other skill components 1090 may providing result data 1330 indicating the skills cannot provide responsive data. Whereas a system not implementing the post-NLU ranker 1395 may select one of the skill components 1090 that could not provide a response, the post-NLU ranker 1395 only selects a skill component 1090 that provides the post-NLU ranker 1395 with result data corresponding to a response, indicating further information is needed, or indicating multiple responses can be generated.

The post-NLU ranker 1395 may select result data 1330, associated with the skill component 1090 associated with the highest score, for output to the user. Alternatively, the post-NLU ranker 1395 may output ranked output data 1325 indicating skill components 1090 and their respective post-NLU ranker rankings. Since the post-NLU ranker 1395 receives result data 1330, potentially corresponding to a response to the user input, from the skill components 1090 prior to post-NLU ranker 1395 selecting one of the skills or outputting the ranked output data 1325, little to no latency occurs from the time skills provide result data 1330 and the time the system outputs responds to the user.

If the post-NLU ranker 1395 selects result audio data to be output to a user and the system determines content should be output audibly, the post-NLU ranker 1395 (or another component of the system component(s) 1020) may cause the device 1010 to output audio corresponding to the result audio data. If the post-NLU ranker 1395 selects result text data to output to a user and the system determines content should be output visually, the post-NLU ranker 1395 (or another component of the system component(s) 1020) may cause the device 1010 to display text corresponding to the result text data. If the post-NLU ranker 1395 selects result audio data to output to a user and the system determines content should be output visually, the post-NLU ranker 1395 (or another component of the system component(s) 1020) may send the result audio data to the ASR component 1050. The ASR component 1050 may generate output text data corresponding to the result audio data. The system component(s) 1020 may then cause the device 1010 to display text corresponding to the output text data. If the post-NLU ranker 1395 selects result text data to output to a user and the system determines content should be output audibly, the post-NLU ranker 1395 (or another component of the system component(s) 1020) may send the result text data to the TTS component 1080. The TTS component 1080 may generate output audio data (corresponding to computer-generated speech) based on the result text data. The system component(s) 1020 may then cause the device 1010 to output audio corresponding to the output audio data.

As described, a skill component 1090 may provide result data 1330 either indicating a response to the user input, indicating more information is needed for the skill component 1090 to provide a response to the user input, or indicating the skill component 1090 cannot provide a response to the user input. If the skill component 1090 associated with the highest post-NLU ranker score provides the post-NLU ranker 1395 with result data 1330 indicating a response to the user input, the post-NLU ranker 1395 (or another component of the system component(s) 1020, such as the orchestrator component 1030) may simply cause content corresponding to the result data 1330 to be output to the user. For example, the post-NLU ranker 1395 may send the result data 1330 to the orchestrator component 1030. The orchestrator component 1030 may cause the result data 1330 to be sent to the device 1010, which may output audio and/or display text corresponding to the result data 1330. The orchestrator component 1030 may send the result data 1330 to the ASR component 1050 to generate output text data and/or may send the result data 1330 to the TTS component 1080 to generate output audio data, depending on the situation.

The skill component 1090 associated with the highest post-NLU ranker score may provide the post-NLU ranker 1395 with result data 1330 indicating more information is needed as well as instruction data. The instruction data may indicate how the skill component 1090 recommends the system obtain the needed information. For example, the instruction data may correspond to text data or audio data (i.e., computer-generated speech) corresponding to "please indicate" The instruction data may be in a format (e.g., text data or audio data) capable of being output by the device 1010. When this occurs, the post-NLU ranker 1395 may simply cause the received instruction data be output by the device 1010. Alternatively, the instruction data may be in a format that is not capable of being output by the device 1010. When this occurs, the post-NLU ranker 1395 may cause the ASR component 1050 or the TTS component 1080 to process the instruction data, depending on the situation, to generate instruction data that may be output by the device 1010. Once the user provides the system with all further information needed by the skill component 1090, the skill component 1090 may provide the system with result data 1330 indicating a response to the user input, which may be output by the system as detailed above.

The system may include "informational" skill components 1090 that simply provide the system with information, which the system outputs to the user. The system may also include "transactional" skill components 1090 that require a system instruction to execute the user input. Transactional skill components 1090 include ride sharing skills, flight booking skills, etc. A transactional skill component 1090 may simply provide the post-NLU ranker 1395 with result data 1330 indicating the transactional skill component 1090 can execute the user input. The post-NLU ranker 1395 may then cause the system to solicit the user for an indication that the system is permitted to cause the transactional skill component 1090 to execute the user input. The user-provided indication may be an audible indication or a tactile indication (e.g., activation of a virtual button or input of text via a virtual keyboard). In response to receiving the user-provided indication, the system may provide the transactional skill component 1090 with data corresponding to the indication. In response, the transactional skill component 1090 may execute the command (e.g., book a flight, book a train ticket, etc.). Thus, while the system may not further engage an informational skill component 1090 after the informational skill component 1090 provides the post-NLU ranker 1395 with result data 1330, the system may further engage a transactional skill component 1090 after the transactional skill component 1090 provides the post-NLU ranker 1395 with result data 1330 indicating the transactional skill component 1090 may execute the user input.

In some instances, the post-NLU ranker 1395 may generate respective scores for first and second skills that are too close (e.g., are not different by at least a threshold difference) for the post-NLU ranker 1395 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 1030, post-NLU ranker 1395, shortlister component 1250, or other component may be trained and operated according to various machine learning techniques.

Figure 14:
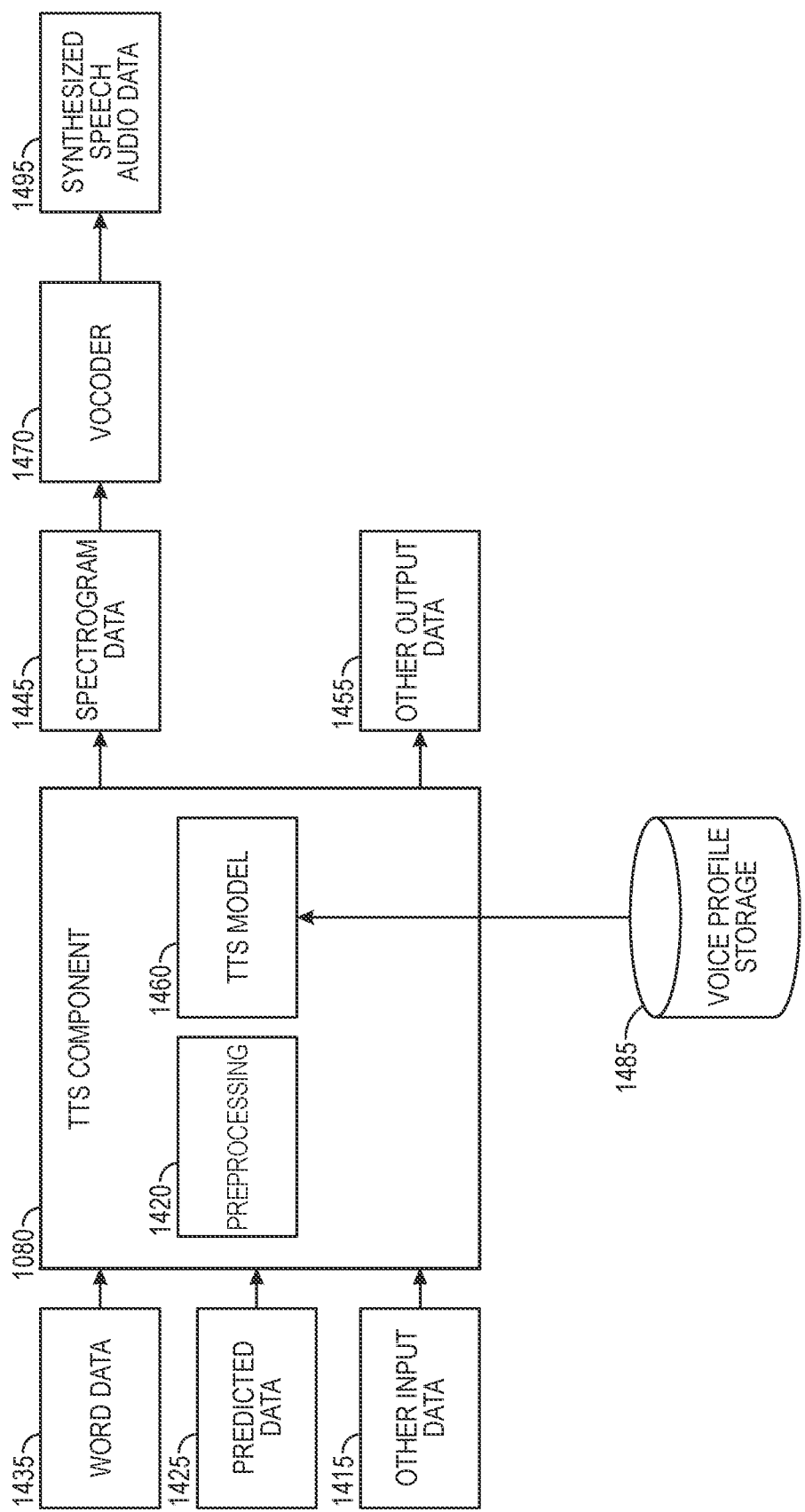
FIG. 14 is a conceptual diagram of a text-to-speech component having features for producing synthesized speech, in accordance with implementations of the present disclosure.

FIG. 14 is a conceptual diagram of a text-to-speech component 1080 having features for producing synthesized speech, according to implementations of the present disclosure. The system 1000 for enhancing speech synthesis may have various applications for generating synthesized speech for use in different contexts. For example, the system 1000 shown in FIG. 10 may be a natural language processing system performing functions of a virtual assistant with which the user may interact by, for example, speaking commands to the system 1000 and receiving responses via synthesized speech. Alternatively, the user may interact through user signals of electrical activity of the brain of the user in response to the user thinking or focusing on a particular input. The user may interact with the system 1000 by inputting spoken commands and/or mental thoughts and receiving responses in the form of synthesized speech. The system 1000 may also convert text to synthesized speech for output to the user. For example, the user may request a reading from a book or other source with a command such as, "Alexa, please read 'Mrs. Dalloway by Virginia Woolf.'" The system 1000 may respond by generating synthesized speech based on the words of the requested work. In some implementations, the system 1000 may generate synthesized speech having voice characteristics of a celebrity, friend, family member, etc. reading the content. For example, the system may "dub" a movie or other programming into different languages, either based on a transcript in the original or target language, and/or using a combination of speech processing, machine translation, and/or TTS. The resulting synthesized speech, translated from the original, may reflect voice characteristics of the original speaker including timbre, prosody, emotion, and/or emphasis. In a similar manner, the system 1000 may provide simultaneous interpretation; for example, in business, diplomatic, and/or tourism contexts. In some implementations, content creators (e.g., authors, advertisers, and/or other users) may chose particular voice characteristics for their works. The voice characteristics may include different representations of emphasis. Different sources/authors may differentiate themselves by associating their works with such characteristics. For example, emphasis may be employed by a virtual assistant, and different virtual assistants may have different "personalities" that may manifest in different levels or types of emphasis. In some implementations, the user (e.g., the person requesting the reading) may set their own voice characteristics; for example, by changing the original or default gender, age, etc., corresponding to the voice of the synthesized speech generated for particular source data. In some implementations, the content creator and/or user 10 may adjust how prosody is reflected in synthesized speech; for example, by adjusting emphasis on a scale from more subtle (e.g., dry or monotone) to more pronounced (e.g., hyperbolic and/or sarcastic), by adjusting emotion content according to relative amounts of emotion primitives and/or macro-descriptors, etc.

The device 1010 may implement a TTS component 1080, which may include features for enhancing prosody to more accurately reflect the variability of human speech based on emotion, topic, setting, context, etc. The system 1000 may perform NLG to generate natural language output for conversion to synthesized speech. The generated natural language output may be, for example a response to a user command or request processed by a skill component 1090 of the system 1000. Additionally, or alternatively, the system 1000 may receive natural language content from various sources including electronic (e.g., digital books, websites, email, messages, etc.), visual (e.g., by performing optical character recognition (OCR) on an image of a page from a book, magazine, letter, etc.), and/or audible (e.g., by performing ASR on speech). Other components of the system 1000 may prepare the natural language content for processing by the TTS component 1080 by, for example, converting it to text data, word or subword token data, phoneme data, or other data format. For the sake of simplicity, the TTS component 1080 may be described below as receiving and processing word data 1435 (e.g., in the form of text data); however, the system 1000 is not so limited.

Components of a system that may be used to perform unit selection, parametric TTS processing, and/or model-based audio synthesis are shown in FIG. 14. FIG. 14 is a conceptual diagram that illustrates operations for generating synthesized speech using a TTS component 1080, according to implementations of the present disclosure. The TTS component 1080 may receive word data 1435 (for example, output from a skill component 1090 or otherwise) and process it using one or more TTS models 1460 to generate synthesized speech in the form of predicted data 1445. A vocoder 1470 may convert the predicted data 1445 into output synthesized speech audio data 1495, which may represent a time-domain waveform suitable for amplification and output as audio (e.g., from a loudspeaker). In various implementations, the TTS component 1080 may include fewer and/or additional components, including those described below with reference to FIGS. 10 and/or 14.

The TTS component 1080 may receive predicted data 1425 from the predictor 1050. The predictor 1050 may process various inputs to determine how to enhance the synthesized speech as previously described. The preprocessing component 1420 and/or the TTS model 1460 may use predicted data 1425 to generate synthesized speech. The preprocessing component 1420 and/or the TTS model 1460 may, prior to generating synthesized speech at runtime, be trained to operate in the same embedding space representing characteristics as the predictor 1050.

The TTS component 1080 may additionally receive other input data 1415. The other input data 1415 may include, for example, identifiers and/or labels corresponding to a desired speaker identity, voice characteristics, emotion, speech style, etc. desired for the synthesized speech. In some implementations, the other input data 1415 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the word data 1435 and/or the other input data 1415 such as metadata accompanying a TTS request and indicating what text should be whispered (or have some other indicated audio characteristic).

The TTS component 1080 may include a preprocessing component 1420 that can convert the word data 1435 and/or other input data 1415 into a form suitable for processing by the TTS model 1460. The word data 1435 may be from, for example an application, a skill component (described further below), an NLG component, another device or source, or may be input by a user. The word data 1435 received by the TTS component 1080 may not necessarily be text, but may include other data (such as symbols, code, other data, etc.) that may reference text (such as an indicator of a word and/or phoneme) that is to be synthesized. The preprocessing component 1420 may transform the word data 1435 into, for example, a symbolic linguistic representation, which may include linguistic context features such as phoneme data, punctuation data, syllable-level features, word-level features, and/or emotion, speaker, accent, or other features for processing by the TTS component 1080. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the word data 1435, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1420 may include functionality and/or components for performing text normalization, linguistic analysis, linguistic prosody generation, or other such operations. During text normalization, the preprocessing component 1420 may first process the word data 1435 and generate standard text, converting such things as numbers, abbreviations (such as Apt., St., etc.), symbols ($, %, etc.) into the equivalent of written out words.

During linguistic analysis, the preprocessing component 1420 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1460 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1420 may also identify different grammatical components such as prefixes, suffixes, phrases, punctuation, syntactic boundaries, or the like. Such grammatical components may be used by the TTS component 1080 to craft a natural-sounding audio waveform output. The language dictionary may also include letter-to-sound rules and other tools that may be used to pronounce previously unidentified words or letter combinations that may be encountered by the TTS component 1080. Generally, the more information included in the language dictionary, the higher quality the speech output.

The output of the preprocessing component 1420 may be a symbolic linguistic representation, which may include a sequence of phonetic units. In some implementations, the sequence of phonetic units may be annotated with prosodic characteristics (e.g., corresponding to the predicted data 1425). In some implementations, prosody may be applied in part or wholly by a TTS model 1460. This symbolic linguistic representation may be sent to the TTS model 1460 for conversion into audio data (e.g., in the form of Mel-spectrograms or other frequency content data format).

The TTS component 1080 may retrieve one or more previously trained and/or configured TTS models 1460 from the voice profile storage 1485. A TTS model 1460 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1460 may be stored in the voice profile storage 1485. A TTS model 1460 may represent a particular speaker identity and may be conditioned based on speaking style, emotion, etc. In some implementations, a particular speaker identity may be associated with more than one TTS model 1460; for example, with a different model representing a different speaking style, language, emotion, etc. In some implementations, a particular TTS model 1460 may be associated with more than one speaker identity; that is, be able to produce synthesized speech that reproduces voice characteristics of more than one character. Thus, a first TTS model may be used to create synthesized speech for the first speech-processing system (e.g., embodied in a first system component) while a second, different, TTS model may be used to create synthesized speech for the second speech-processing system (e.g., embodied in a second system component). In some cases, the TTS model 1460 may generate the desired voice characteristics based on conditioning data received or determined from the word data 1435 and/or the other input data 1415. For example, a synthesized voice of the first speech-processing system 1020A may be different from a synthesized voice of the second speech-processing system 1020B.

The TTS component 1080 may, based on an indication received with the word data 1435 and/or other input data 1415, retrieve a TTS model 1460 from the voice profile storage 1485 and use it to process input to generate synthesized speech. The TTS component 1080 may provide the TTS model 1460 with any relevant conditioning labels, such as predicted data 1425, emphasis data, etc., to generate synthesized speech having the desired voice characteristics. The TTS model 1460 may generate predicted data 1445 (e.g., frequency content data) representing the synthesized speech, and send it to the vocoder 1470 for conversion into an audio signal.

The TTS component 1080 may generate other output data 1455. The other output data 1455 may include, for example, indications or instructions for handling and/or outputting the synthesized speech. For example, the word data 1435 and/or other input data 1415 may be received along with metadata, such as SSML tags, indicating that a selected portion of the word data 1435 should be louder or quieter. Thus, the other output data 1455 may include a volume tag that instructs the vocoder 1470 to increase or decrease an amplitude of the output speech audio data 1495 at times corresponding to the selected portion of the word data 1435. Additionally, or alternatively, a volume tag may instruct a playback device to raise or lower a volume of the synthesized speech from the device's current volume level, or lower a volume of other media being output by the device (e.g., to deliver an urgent message).

The vocoder 1470 may convert the predicted data 1445 generated by the TTS model 1460 into an audio signal (e.g., an analog or digital time-domain waveform) suitable for amplification and output as audio. The vocoder 1470 may be, for example, a universal neural vocoder based on Parallel WaveNet or related model. The vocoder 1470 may take as input audio data in the form of, for example, a Mel-spectrogram with 80 coefficients and frequencies ranging from 50 Hz to 12 kHz. The synthesized speech audio data 1495 may be a time-domain audio format (e.g., pulse-code modulation (PCM), waveform audio format (WAV), u-law, etc.) that may be readily converted to an analog signal for amplification and output by a loudspeaker. The synthesized speech audio data 1495 may consist of, for example, 8-, 16-, or 24-bit audio having a sample rate of 16 kHz, 24 kHz, 44.1 kHz, etc. In some implementations, other bit and/or sample rates may be used.

It should be understood that, unless otherwise explicitly or implicitly indicated herein, any of the features, characteristics, alternatives or modifications described regarding a particular implementation herein may also be applied, used, or incorporated with any other implementations described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 1 through 3 and 5 through 9, orders in which such methods, processes, or steps are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "near," "nearly" or "substantially" may refer to an amount that is within less than 10% of, within less than 5% of, within less than 1% of, within less than 0.1% of, and within less than 0.01% of the stated amount.

What is claimed is:
1. A computer-implemented method, comprising:
   audibly presenting two or more options for selection by a user, wherein:

a first option of the two or more options is audibly presented in a first spatial direction with respect to a head of the user; and a second option of the two or more options is audibly presented in a second spatial direction with respect to the head of the user, wherein the first spatial direction is different than the second spatial direction;

as the two or more options are audibly presented, receiving, from at least one sensor positioned on a body of the user, a signal representative of an electrical activity produced by the body of the user and indicative of a gaze direction of an eye of the user in the first spatial direction corresponding to the first option; and in response to the signal, causing an action associated with the first option to be performed.

2. The computer-implemented method of claim 1, further comprising:

detecting a trigger signal representative of a known electrical activity produced by the user; and determining the two or more options based at least in part on the trigger signal; and wherein audibly presenting the first option and the second option is in response to detecting the trigger signal.

3. The computer-implemented method of claim 2, wherein detecting the trigger signal comprises detecting a defined user trigger signal representative of a first known electrical activity detected in response to an eye movement of the eye of the user or a second known electrical activity detected in response to a brain activity of a brain of the user.

4. The computer-implemented method of claim 1, further comprising:

audibly presenting the first option a plurality of times, including the first option presented before the second option;

as the first option is presented, receiving, from the at least one sensor, the signal; and as the second option is presented, receiving, from the at least one sensor, a second signal representative of a second electrical activity produced by the body of the user and indicative of a second gaze direction of the eye of the user.

5. The computer-implemented method of claim 1, wherein the at least one sensor is positioned near an ear of the user.

6. A method, comprising:

receiving, from a sensor coupled to a body of a user, a signal representative of an electrical activity produced by the body of the user and indicative of a gaze direction of an eye of the user detected in response to an audible presentation of a plurality of options;

determining, based at least in part on the signal, an action to be performed; and causing the action to be performed.

7. The method of claim 6, further comprising:

determining a similarity score indicative of a similarity between the signal and a stored electrical signal; and determining the action based at least in part on the similarity score.

8. The method of claim 7, further comprising:

prior to receiving the signal:

receiving, from the sensor, a second signal indicative of a series of eye movements of the eye of the user;

receiving an indication of the action; and storing the second signal and an association of the action with the second signal; and determining the action to be performed based at least in part on a similarity between the signal and the second signal.

9. The method of claim 6, further comprising:

receiving an input; and determining the action to be performed is further based at least in part on the input and the signal.

10. The method of claim 9, further comprising:

receiving the input as at least one of a gesture presented by the user, a head motion of the user, a body motion of the user, or an ear canal acoustic response indicative of a middle ear impedance of the user.

11. The method of claim 6, further comprising:

audibly presenting a first option of the plurality of options in a first spatial direction; and audibly presenting a second option of the plurality of options in a second spatial direction that is different than the first spatial direction.

12. The method of claim 11, further comprising:

receiving the signal in response to audibly presenting the plurality of options.

13. The method of claim 6, further comprising:

determining a confidence score indicative of a confidence that the gaze direction has been determined from the signal; and in response to determining that the confidence score does not satisfy a threshold:

receiving, from the sensor, a second signal representative of a second electrical activity produced by the body of the user and indicative of a second gaze direction of the eye of the user;

determining, based at least in part on the signal and the second signal, the action to be performed; and causing the action to be performed.

14. The method of claim 13, further comprising:

audibly presenting a first option corresponding to the action in a first spatial direction corresponding to the gaze direction; and audibly presenting the first option in a second spatial direction corresponding to the second gaze direction.

15. An apparatus, comprising:

an electrode to be positioned on a head of a user;

a transducer to present audible outputs to the user;

one or more processors; and a memory storing program instructions that, when executed by the one or more processors, cause the one or more processors to at least:

output, through the transducer, an audible presentation of at least a first option and a second option, wherein the first option is audibly presented in a first spatial direction with respect to the head and the second option is audibly presented in a second spatial direction with respect to the head;

receive, from the electrode, a signal representative of an electrical activity produced by a body of the user and indicative of a gaze direction of an eye of the user detected in response to the audible presentation;

determine, based at least in part on the signal, that the first option is to be selected; and in response to determination that the first option is to be selected, cause an action associated with the first option to be performed.

16. The apparatus of claim 15, wherein the program instructions that, when executed by the one or more processors to determine that the first option is to be selected, further cause the one or more processors to at least:

determine, based at least in part on the signal, that the eye of the user is gazing in the first spatial direction in response to the audible presentation.

17. The apparatus of claim 15, wherein the program instructions that, when executed by the one or more processors, further cause the one or more processors to at least:
receive, from the electrode, a second signal representative of a second electrical activity produced by the body of the user and indicative of a series of eye movements performed by the eye of the user;
determine a second action associated with the series of eye movements; and
cause the second action to be performed.

18. The apparatus of claim 17, wherein the second action is the output of the audible presentation.

19. The apparatus of claim 17, wherein the program instructions that, when executed by the one or more processors, further cause the one or more processors to at least:
determine a similarity score based at least in part on the second signal and a stored signal; and
wherein determining the second action is based at least in part on the similarity score.

20. The apparatus of claim 19, wherein the program instructions that, when executed by the one or more processors, further cause the one or more processors to at least:
receive an input, wherein the input is at least one of a gesture presented by the user, a head motion of the user, a body motion of the user, or an ear canal acoustic response indicative of a middle ear impedance of the user; and
determine that the first option is to be selected is further based at least in part on the input.

* * * * *